(12) United States Patent
Balandin et al.

(10) Patent No.: US 9,613,065 B2
(45) Date of Patent: *Apr. 4, 2017

(54) METHOD AND APPARATUS FOR SELECTIVE SHARING OF SEMANTIC INFORMATION SETS

(71) Applicant: NOKIA TECHNOLOGIES OY, Espoo (FI)

(72) Inventors: Sergey Balandin, Helsinki (FI); Ian Justin Oliver, Söderkulla (FI); Sergey Boldyrev, Söderkulla (FI)

(73) Assignee: NOKIA TECHNOLOGIES OY, Espoo (FI)

(*) Notice: Subject to any disclaimer, the term of this patent is extended or adjusted under 35 U.S.C. 154(b) by 417 days.

This patent is subject to a terminal disclaimer.

(21) Appl. No.: 14/068,884

(22) Filed: Oct. 31, 2013

(65) Prior Publication Data

US 2014/0058994 A1 Feb. 27, 2014

Related U.S. Application Data

(63) Continuation of application No. 12/555,584, filed on Sep. 8, 2009, now Pat. No. 8,615,551.

(51) Int. Cl.
*G06F 15/16* (2006.01)
*G06F 15/173* (2006.01)
(Continued)

(52) U.S. Cl.
CPC ....... *G06F 17/30289* (2013.01); *G06Q 10/10* (2013.01)

(58) Field of Classification Search
CPC ..... H04L 63/102; H04L 67/16; H04L 67/306; H04L 29/12113; H04L 29/12207;
(Continued)

(56) References Cited

U.S. PATENT DOCUMENTS 5,832,477 A * 11/1998 Bhargava .......... G06F 17/30463
6,457,062 B1 9/2002 Pivowar et al.
(Continued)

FOREIGN PATENT DOCUMENTS

| CN | 1959679 A | 5/2007 |
| WO | 2008/113153 A1 | 9/2008 |
| WO | 2008113153 A1 | 9/2008 |

OTHER PUBLICATIONS

Office Action for corresponding Chinese Patent Application No. 201080045970.3, dated Sep. 7, 2015, with English-language summary, 12 Pages.
(Continued)

*Primary Examiner* — Farzana Huq
(74) *Attorney, Agent, or Firm* — Ditthavong & Steiner, P.C.

(57) ABSTRACT

An approach is provided for selective sharing of semantic information sets in a smart space interoperable across platforms, devices, and equipment. A personal smart space application creates a personal information space for a user, wherein the personal information space includes a plurality of semantic information sets. Thereafter, the personal smart space application receives a request for selective sharing of the semantic information sets, and merges, in response to the request, a projection of the selected semantic information sets into a shared information space.

18 Claims, 17 Drawing Sheets

(51) Int. Cl.
*G06F 17/30* (2006.01)
*G06Q 10/10* (2012.01)

(58) Field of Classification Search
CPC ... H04L 29/12783; H04L 61/20; H04L 61/35; H04L 51/10; H04L 51/12; H04L 51/14; H04L 12/585; H04L 12/5855; H04L 12/1859
USPC .......................... 709/204, 207, 217, 223, 249
See application file for complete search history.

(56) References Cited

U.S. PATENT DOCUMENTS

| | | | |
|---|---|---|---|
| 7,587,501 | B2 | 9/2009 | Stillion et al. |
| 7,672,953 | B2 | 3/2010 | McAniff et al. |
| 7,796,190 | B2* | 9/2010 | Basso ................ H04N 21/2389 348/445 |
| 8,051,157 | B2 | 11/2011 | Park et al. |
| 2003/0125063 | A1 | 7/2003 | Svensson et al. |
| 2007/0245245 | A1 | 10/2007 | Blue et al. |
| 2007/0255785 | A1 | 11/2007 | Hayashi et al. |
| 2008/0133776 | A1* | 6/2008 | Park ........................ H04L 67/16 709/249 |
| 2009/0203389 | A1 | 8/2009 | Bhat |
| 2009/0264140 | A1* | 10/2009 | Bain .................... G06Q 10/107 455/466 |
| 2011/0289437 | A1* | 11/2011 | Yuen .................. G06F 17/3089 715/762 |

OTHER PUBLICATIONS

Bernardi, A.: The NEPOMUK Project. The Social Semantic Desktop NEPOMUK, Published: Dec. 12-13, 2007, pp. 1-25, ftp://ftp.cordis.europa.eu/pub/ist/docs/kct/nepomuk-121207_en.pdf.

Balandin et al., "Distributed Architecture of a Professional Social Network on top of M3 Smart Space Solution made in PCs and Mobile Devices Friendly Manner", 2009 Third International Conference on Mobile Ubiquitous Computing, Systems, Services and Technologies, IEEE Computer Society, pp. 318-323.

Oliver et al., "Dynamic, Localized Space Based Semantic Webs", IADIS International Conference WWW/Internet 2008, pp. 426-431.

International search report and written opinion for corresponding International Application No. PCT/FI2010/050623 dated Dec. 14, 2010, pp. 1-15.

Lappetelainen et al., "Networked Systems, Services abd Information, The Ultimate Digital Convergence", NOTA2008, the 1st International Network on Terminal Architeture Conference, Jun. 11, 2008, Helsinki, Finland, http://nota-world.net/files/common/TheUltimateDigitalConvergence.pdf, pp. 1-7.

Ehrig et al., The SWAP Data and Metadata Model for Semantics-Based Peer-to-Peer Systems, in MATES 2003, Schillo et al. (Eds.), Lecture Notes in Artificial Intelligence, vol. 2831, Springer-Verlag Berlin Heidelberg, pp. 144-155.

Weiss et al., "Hexastore: Sextuple Indexing for Semantic Web Data Management", Aug. 23-28, 2008, VLDB Endowment, ACM 978-1-60558-305-1.

Chinese Office Action corresponding to Chinese Patent Application No. 201080045970.3 with English-language summary, dated Dec. 11, 2014;13 pages.

Lappetelainen et. al., "Networked Systems, Services, and Information—The Ultimate Digital Convergence", 1st International Conference on Network on Terminal Architecture [online], Jun. 11, 2008, Helsinki, Finland, pp. 1-7.

Ehrig et al., "The SWAP Data and Metadata model for Semantics-Based Peer-to-Peer Systems", in Proceedings of MATES-2003, First German Conference on Multiagent Technologies, Germany, LNAI, Springer, 2003, pp. 144-155.

Office Action for corresponding Chinese Patent Application No. 201080045970.3 dated Mar. 28, 2016, with English-language summary, 12 Pages.

Office Action for corresponding Chinese Patent Application No. 201080045970.0, dated Sep. 27, 2016, with English Language Summary, 6 pages.

European Office Action for related European Patent Application No. 108150327-1507 dated Nov. 18, 2016, 6 Pages.

Brodt et aL, "Together we are strong-towards Ad-Hoc Smart Spaces", IEEE International Conference on Pervasive computing and Communications, Mar. 9-13, 2009, retrieved on Nov. 18, 2016 from https://pdfs.semanticscholar.org/b6ceicb8783c1cOdd26303f25c35ebdef04b53279.pdf, 5 pages.

Boldyrev et al., "A Mechanism for Managing and Distributing Information and Queries in a Smart Space Environment", Proceedings of the 1st International Workshop on Managing Data with Mobile Devices, May 5, 2016, Retrieved on Nov. 18, 2016 from http://citeseerxist.psu.eduiviewdoc/download? loi=10.1.1A71.9304&rep=rep1&type=pdf, 10 pages.

* cited by examiner though the technologies have been slow with respect to social networking services.

METHOD AND APPARATUS FOR SELECTIVE SHARING OF SEMANTIC INFORMATION SETS

RELATED APPLICATION

This application is a continuation of prior application Ser. No. 12/555,584, filed Sep. 8, 2009, which is herein incorporated by reference in its entirety.

BACKGROUND

Social networking is attracting growing numbers of Internet users and becoming the predominant service provided over the Internet. At the same time, the number of new users connected to Internet through mobile devices is growing faster than the number of users connected through personal computers. This creates a strong demand for a social networking solution that is equally operable from personal computers and from mobile devices. One area of development involves emerging smart space technologies. These technologies, for instance, are truly mobile by nature and enable equally efficient applications for personal computers and mobile devices. A smart space platform also enables flexible and efficient tools for user account and access management. However, the introduction of smart space technologies has been slow with respect to social networking services.

SOME EXAMPLE EMBODIMENTS

Therefore, there is a need for an approach for providing a personal smart space platform to enable a user to freely integrate social network information with other information stored in the devices (e.g., mobile devices and/or personal computers) of the user, while maintaining all personal data under full control of the user.

According to one embodiment, a method comprises creating a personal information space for a user, wherein the personal information space includes a plurality of semantic information sets. The method also comprises receiving a request for selective sharing of the semantic information sets. The method further comprises merging, in response to the request, a projection of the selected semantic information sets into a shared information space.

According to another embodiment, an apparatus comprising at least one processor, and at least one memory including computer program code, the at least one memory and the computer program code configured to, with the at least one processor, cause the apparatus to create a personal information space for a user, wherein the personal information space includes a plurality of semantic information sets. The apparatus is also caused to receive a request for selective sharing of the semantic information sets. The apparatus is further caused to merge, in response to the request, a projection of the selected semantic information sets into a shared information space.

According to another embodiment, a computer-readable storage medium carrying one or more sequences of one or more instructions which, when executed by one or more processors, cause an apparatus to create a personal information space for a user, wherein the personal information space includes a plurality of semantic information sets. The apparatus is also caused to receive a request for selective sharing of the semantic information sets. The apparatus is further caused to merge, in response to the request, a projection of the selected semantic information sets into a shared information space.

According to another embodiment, an apparatus comprises means for creating a personal information space for a user, wherein the personal information space includes a plurality of semantic information sets. The apparatus also comprises means for receiving a request for selective sharing of the semantic information sets. The apparatus further comprises means for merging, in response to the request, a projection of the selected semantic information sets into a shared information space.

According to another embodiment, a method comprises generating a request specifying selective sharing of semantic information sets corresponding to a personal information space. The method also comprises initiating transmission of the request to a peer user equipment for merging a projection of the semantic information sets into a shared information space.

According to another embodiment, an apparatus comprising at least one processor, and at least one memory including computer program code, the at least one memory and the computer program code configured to, with the at least one processor, cause the apparatus to generate a request specifying selective sharing of semantic information sets corresponding to a personal information space. The apparatus is also caused to initiate transmission of the request to a peer user equipment for merging a projection of the semantic information sets into a shared information space.

According to another embodiment, a computer-readable storage medium carrying one or more sequences of one or more instructions which, when executed by one or more processors, cause an apparatus to generate a request specifying selective sharing of semantic information sets corresponding to a personal information space. The apparatus is also caused to initiate transmission of the request to a peer user equipment for merging a projection of the semantic information sets into a shared information space.

According to another embodiment, an apparatus comprises means for generating a request specifying selective sharing of semantic information sets corresponding to a personal information space. The apparatus also comprises means for initiating transmission of the request to a peer user equipment for merging a projection of the semantic information sets into a shared information space.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

A method and apparatus for selective sharing of semantic information sets in a smart space interoperable across platforms, devices, and equipment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to sharing semantic information sets between social networks, communication platforms, personal computers, and mobile devices, it is contemplated that the approach described herein may be used with other web services.

Figure 1:
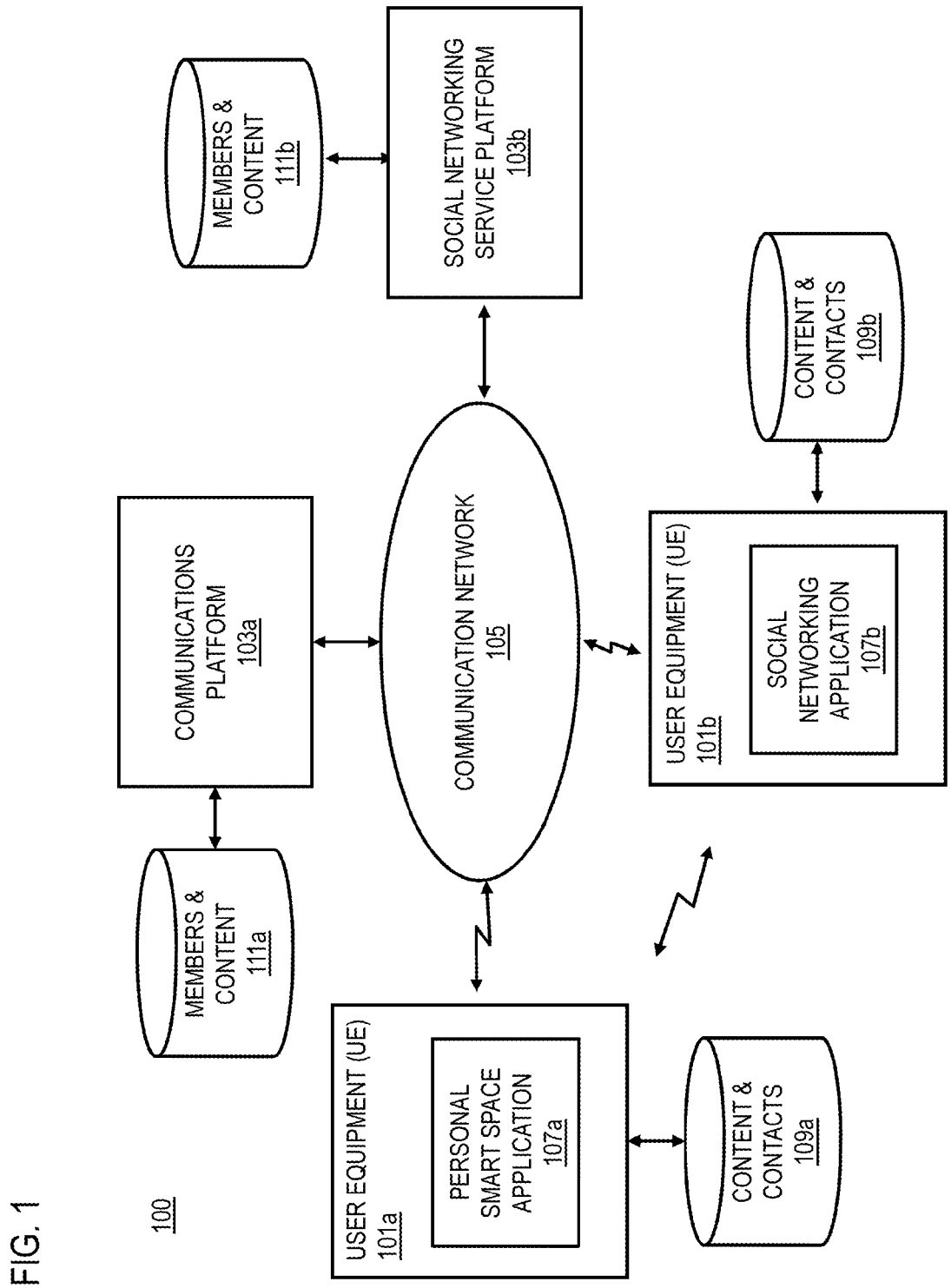
FIG. 1 is a diagram of a system capable of selective sharing of semantic information sets in a smart space interoperable across platforms, devices, and equipment, according to one embodiment.

FIG. 1 is a diagram of a system capable of selective sharing of semantic information sets in a smart space interoperable across platforms, devices, and equipment, according to one embodiment. Even though the number of mobile Internet users is large and growing, social networking services have not traditionally been designed specifically for mobile use. When a mobile user wants to be socially networked, the user either cannot access the social networking service or is forced to use a personal computer application adapted for a mobile device. This creates problems and inconveniences for the user.

A key problem is an inefficient User Interface (UI) for the mobile device, which is usually a scaled-down version of a personal computer UI (i.e., eliminating some functions). For example, the scaled-down UI generally does not support personal preferences and imposes restrictions on use. As a result, most social networking users rarely use the mobile version of the corresponding social networking application and/or use it only when they have no other alternatives. Accordingly, there is a need to enable the user to easily build a personalized social networking client UI out of the provided library of blocks and make completely new blocks including blocks with inherited functionality.

A deeper problem is rooted in the architectural principles of existing social network platforms and the semantic web. Generally, the existing social network platforms were designed to support personal computers and follow client-server principles. This results in disadvantages of a monolithic architecture of the social network application client, platform dependency, lack of flexibility in selecting data repository, and complicated (sometimes even prevention of) joint use of information in cooperation with other services.

Another aspect of the problem is built in the semantic web. The semantic web is a universal medium for data, information, and knowledge exchange. This information exchange inserts documents with computer-comprehensible meaning (semantics) and makes them available on the semantic web. Knowledge in the semantic web is structured and organized at a finer level of granularity than free-text document, and the vocabulary includes not only literal words but also universal identifiers. The semantic web is designed to share information based upon common representation formats, ontologies and semantics, such that information would become globally ubiquitous and interoperable. However much of the information is not desired to ubiquitous, but remain hidden, private and is interpreted locally, such as personal information. When two personal smart spaces partially merge, a node object may connect to both smart spaces at a time.

Today, users share a lot of personal information via social networks. However, many users are concerned about the privacy of the shared personal information because the information is often controlled by the social network host instead of the users. As a result of these concerns, these users may limit their activities in social networks. To address to this issue, a smart space architecture (an entity focused structure) is developed such that a user can encapsulate all of personal information and interact with the information in the smart space according to the user's individual semantics and needs. The user can be a person, an organization, or other entity.

To address these problems, a system 100 of FIG. 1 introduces the capability to further growth of social network services by enabling equally efficient use from all type of devices and providing users with more control over sharing information posted to the social networks.

As shown in FIG. 1, the system 100 comprises a user equipment (UE) 101 having connectivity to and communication platform 103a and a social networking service platform 103b via a communication network 105. Each of the platforms 103 has a members and content database 111, and the UE 101 has a content and contacts database 109. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UEs 101 and the platforms 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
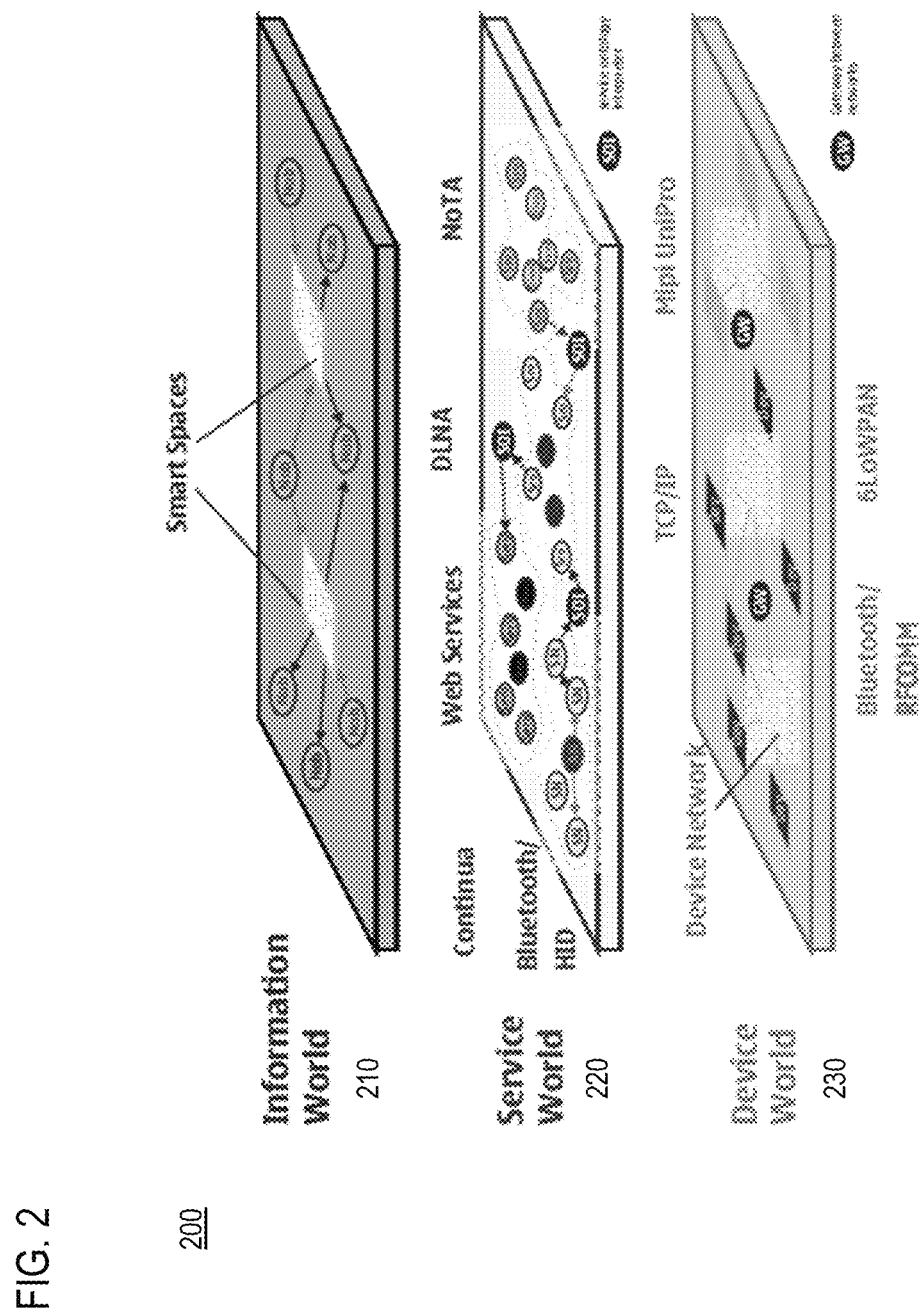
FIG. 2 is a diagram of the layers and components of a smart space interoperability architrave, according to one embodiment.

FIG. 2 is a diagram 200 of the levels and components of a smart space interoperability architrave, according to one embodiment. A smart space is a named search extent of information and offers interoperability at three different levels: an information world level 210, a service world level 220 and a device world level 230. Each of the smart spaces interoperates over information at the information world level 210 as authorized, over different service platforms in the service world level 220, and over different devices and equipment in the device world level 230. Device interoperability covers technologies for a group of devices to discover and network with each other. These device technologies can include, for example, transmission control protocol/Internet protocol (TCP/IP), Unified Protocol (UniPro) created by the Mobile Industry Processor Interface (MIPI) Alliance, Bluetooth protocol Radio Frequency Communication (RF-COMM), IPv6 over Low power Wireless Personal Area Networks (6LoWPAN), etc. Also, technologies from antenna or cable connectors to TCP/IP together provide interoperability between the devices. Service interoperability covers technologies used for discovering and using services, such as Bluetooth/human interface device (HID) services, web services, services certified by the Digital Living Network Alliance (DLNA), the Network on Terminal Architecture (NoTA). As an example, universal plug and play (UPnP) specifies a service discovery process and means for an application in a device to command a service in another device to "play" and "pause" content. The information interoperability covers technologies and processes for making information available without knowing interfacing methods of the entity creating or consuming the information. By way of example, there are two key constructs at the information level of interoperability: (1) an infrastructure that enables scalable producer-consumer transactions for information, and supports multipart, multidevice and multivendor (M3), and (2) a common representation of a set of concepts within a domain and the relationships between those concepts, i.e. ontologies. The smart space as a logical architecture has no dependencies on any network architecture but it can be implemented on top of practically any connectivity solution. Since there is no specific service level architecture, the smart space has no limitation in physical distance or transport.

For instance, when implemented using NoTA, information sharing via the smart space becomes transport independent, and the smart space can utilize service discovery, security and access policies of a particular resource manager (RM) and billboard (BB) of a NoTA network. The smart space allows cross domain search and provides a uniform, use case independent service application programming interface (API) for sharing information. As an example, the smart space allows an application programmer who programs for a mobile platform to access contextual information in, e.g., a car, home, office, football stadium, etc., in a uniform way and to improve the user experience, without compromising real-time requirements of the embedded system. The smart space uses an ontology governance process as the alternative to use case specific service API standardization. The ontology governance process agrees and adopts new vocabularies using Resource Description Language format (RDF) and RDFS (RDF schema). If RDFS is not sufficient for defining and instantiating the ontologies, web ontology language (OWL) or the like can be used.

The smart space stores information in RDF, for at least two reasons. First, RDF provides the ability to join data from vocabularies from different business domains, without having to negotiate structural differences between the vocabularies. Second, the smart space can merge the information of the embedded domains with the information in web, as well as make the vast reasoning and ontology theory, practice and tools developed by the semantic web community available for smart space application developers. The smart space makes the heterogeneous information in embedded domains available for the semantic web tools. Each smart space can be constructed by physically distributed RDF stores. This allows implementations where the personal information of a family is stored at home while it is augmented by non-personal information at a website (e.g., a social networking website). For example, an operator may prefer to augment rather than merge information because of, for instance, copyright and/or privacy concerns.

Figure 3:
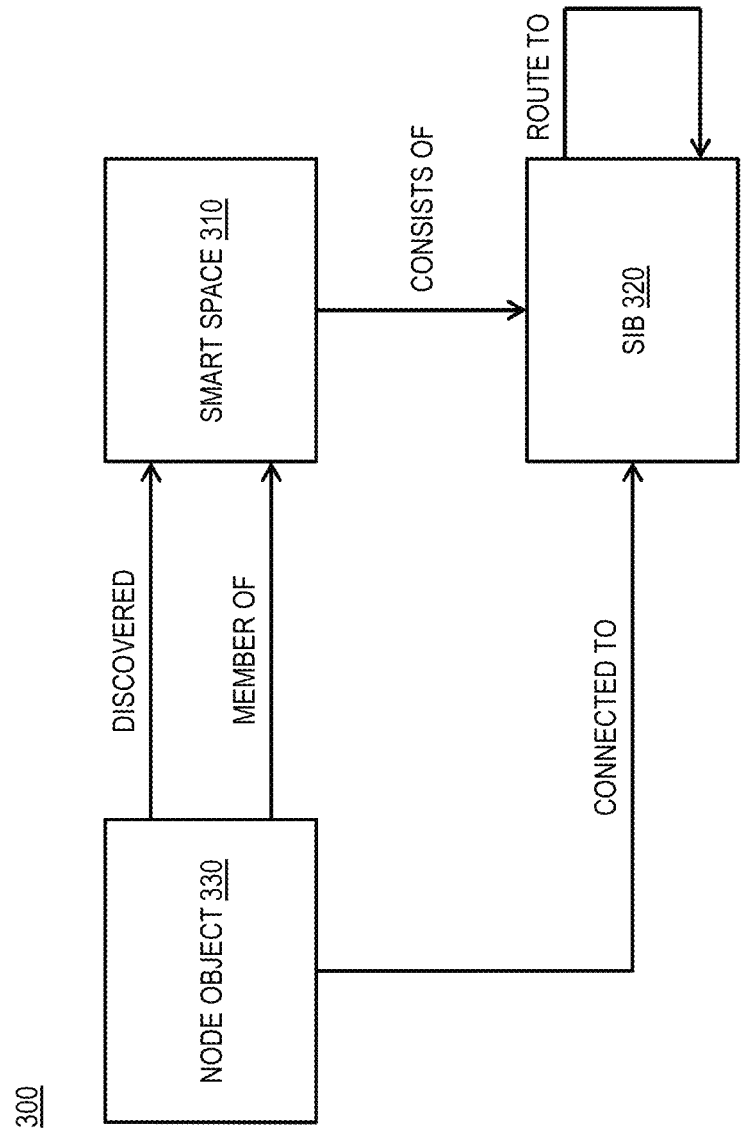
FIG. 3 is a diagram of a smart space infrastructure domain model, according to one embodiment.

FIG. 3 is a diagram 300 of a smart space 310 infrastructure domain model, according to one embodiment. The domain model consists of smart space node objects 330 and semantic information brokers (SIB) 320 which form the nucleus of the information world layer 210 defined in FIG. 2. In the smart space, a user can use one or more node objects 330 (e.g., mobile telephones, computers, and similar terminals) to perform tasks without knowing anything about the nodes 330, and the nodes 330 interoperate anonymously by communicating implicitly through smart spaces of different users. Such anonymity simplifies control, communication and coordination in the smart space, thereby reducing hardware and software operation time and costs. Node objects 330 are personal/individual in that they perform tasks either directly decided by the user or autonomously for or on behalf of the user. For example, the nodes 330 can monitor predetermined situations or reason/data-mine information available in the smart space 310.

Each SIB 320 is an entity performing triple governance in possible co-operation with other SIBs 320 for one smart space 310. An SIB 320 may be a concrete or virtual entity. Each SIB 320 also supports the smart space node objects 330 interacting with other SIBs 320 through information transaction operations. By way of example, a triple is a subject-predicate-object expression in RDF. The subject denotes the resource, and the predicate denotes traits or aspects of the resource and expresses a relationship between the subject and the object. For example, one way to represent the notion "the manager went to Finland for a business negotiation" in RDF as the triple is: a subject denoting "the manager," a predicate denoting "went to," and an object denoting "Finland for a business negotiation." RDF is an abstract model with several serialization formats (i.e., file formats), and so the particular way in which a resource or triple is encoded varies from format to format. The triple governance transactions using a smart space Access Protocol (SSAP) to, e.g., join, leave, insert, remove, update, query, subscribe, unsubscribe information (e.g., in a unit of a triple). Physical distribution protocol of a smart space 310 allows a formation of a smart space 310 using multiple SIBs 320. With transactional operations, a node object 330 produces/inserts and consumes/queries information in the smart space 310. Because distributed SIBs 320 can belong to the same smart space 310, query and subscription operations relating to the SIBs 320 can cover the whole information extent of the smart space 310. In this example, a subscription is a special query that is used to trigger reactions to persistent queries for information.

Figure 4:
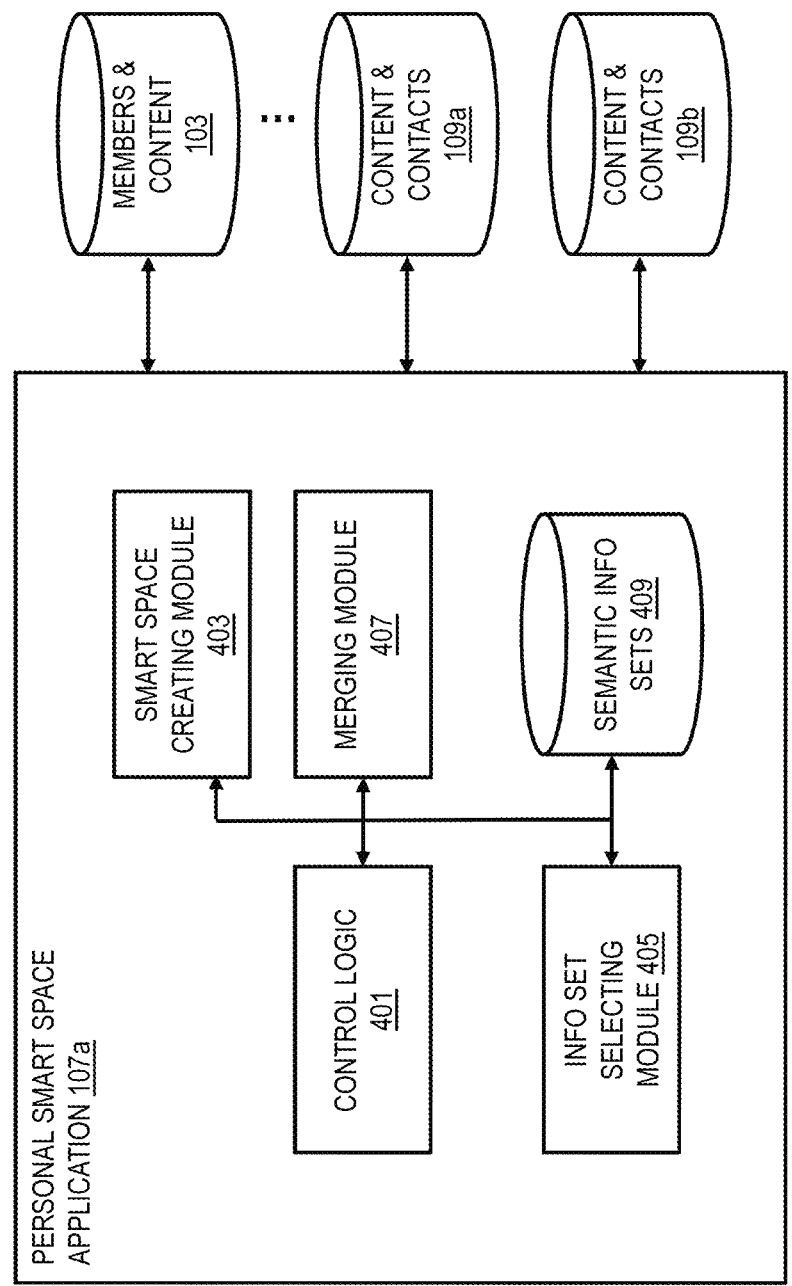
FIG. 4 is a diagram of the components of a personal smart space application in a user equipment, according to one embodiment.

FIG. 4 is a diagram of the components of a personal smart space application 107 in the UE 101 according to one embodiment. In one embodiment, the personal smart space application 107 is implemented as a widget. By way of example, widgets are light-weight applications, and provide a convenient means for presenting information and accessing services. It is contemplated that the functions of these components may be combined in one or more components or performed by other components of equivalent functionality. By way of example, the personal smart space application 107 includes one or more components for providing selective sharing of semantic information sets in a smart space interoperable across platforms, devices, and equipment. A semantic information set is a unit of semantic information. For example, the triple mentioned previously (e.g., "the manager went to Finland for a business negotiation") can be a semantic information set. An example of sharing the semantic information set between two smart spaces may be that as the manager enters her rental car carrying her personal device, the information in her calendar about the address of the business negotiation is made available for her rental car smart space and the rental car navigation system enhances her user experience by automatically proposing guidance to the location mentioned in the calendar entry. The navigation system does not need to know who provides the information nor does the calendar application have to know who uses the information and the related APIs. It is contemplated that the functions of these components may be combined in one or more components or performed by other components of equivalent functionality.

In this embodiment, the personal smart space application 107 includes at least a control logic 401 which executes at least one algorithm for executing functions of the personal smart space application 107, a smart space creating module 403 for creating a personal smart space for the user, and a semantic information set selecting module 405 for selecting semantic information sets to be shared with another user. The personal smart space application 107 also includes a merging module 407 for merging projections of the selected semantic information sets into a shared smart space, and a semantic information sets database 409 for storing semantic information sets. To avoid data transmission costs as well as save time and battery life, the control logic 401 can fetch data cached or stored in the database 409, without requesting data from any servers or external platforms, such as the communications platform 103a or the social network service platforms 103b. Usually, if the UE 101 is online, data queries are made to online search server backends, and once the device is off-line, searches are made to off-line indexes stored locally.

Persons or groups of persons, etc. can place, share, interact, and manipulate webs of information with their own locally agreed semantics without necessarily conforming to a uniform or global semantics. In one embodiment, smart spaces 310 are projections of a global information space in which one can apply semantics and reasoning at a local level. The nature of projection is such that a tree of projected spaces 310 can be formed thus avoiding circularity among the projected spaces 310 and the global information space. In one embodiment, the contents of a projected space 310 can be returned to the global information space by injecting (e.g., merging) information of the projected space 310 back into the global information space. The injection also induces a merger of information over any other projected spaces 310 that depend from the global information space. In this way, any changes within a projected space 310 can be sent back to the global information space and propagated to other projected spaces 310. To facilitate the propagation of information among projected spaces 310 and protect information security and integrity, users or owners of the projected spaces 310 can, for instance, agree to or reject an information merger through trust or authentication mechanisms and/or through the shared semantics of the information.

Alternatively, the functions of the personal smart space application 107 can be implemented via the communications platform 103a or the social network service platform 103b.

Figure 5A:
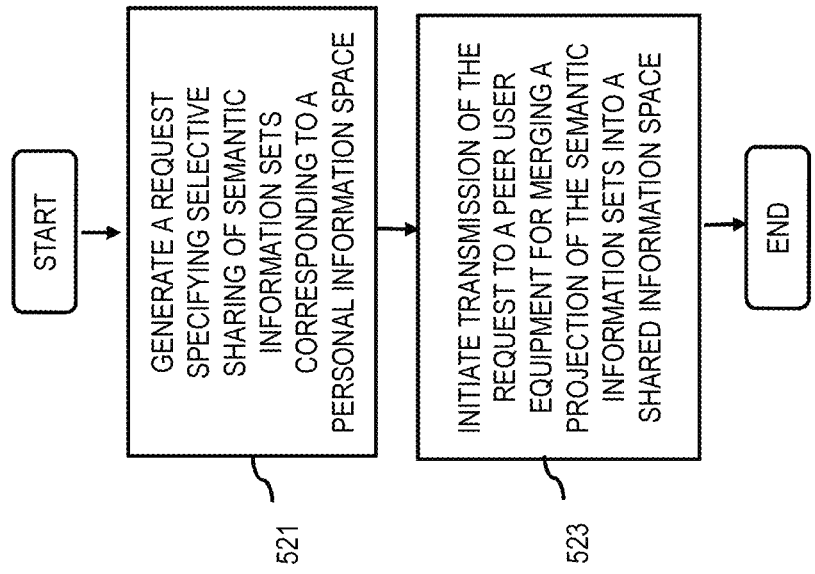
FIGS. 5A and 5B are flowcharts of a process for providing a shared smart space of two users and a process for requesting a shared smart space of two users, according to one embodiment.

FIG. 5A is a flowchart of a process for providing a shared smart space of two users (e.g., the manager and her secretary), according to one embodiment. In one embodiment, the personal smart space application 107 of the UE 101a (e.g., of the manager) performs the process 500 and is implemented in, for instance, a chip set including a processor and a memory as shown FIG. 16. In step 501, the personal smart space application 107 creates a personal information space for a user (e.g., the manager), wherein the personal information space includes a plurality of semantic information sets (e.g., the manager's business calendar including "the manager went to Finland for a business negotiation"). Thereafter, the personal smart space application 107 receives a request for selective sharing of the semantic information sets (Step 503), for example, sharing with the manager's secretary, and merges, in response to the request, a projection of the selected semantic information sets (e.g., the manager's calendar including the entry of her business negotiation in Finland) into a shared information space (Step 505) (such that her secretary can share the manager's business calendar). The projection of the selected semantic information sets to the shared information space allows copying and synchronizing the selected semantic information sets in a real time manner when the manager or her secretary make changes to the calendar. As mentioned, the smart space is accessible via any device or equipment (e.g., the manager's personal devices, the rental car's navigation system, the secretary's desktop computer, a web cafe PC in Finland, etc) connected to the SIBs.

Figure 5B:
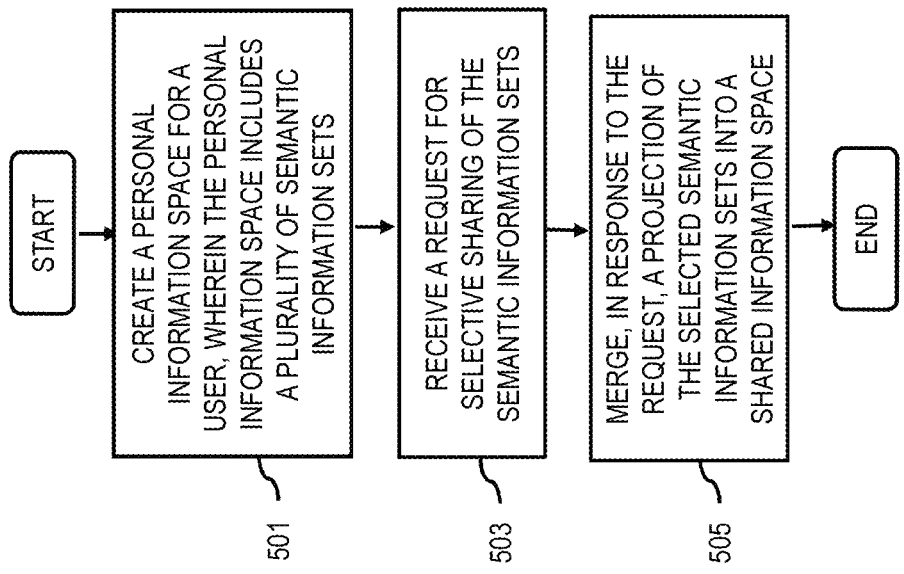

FIG. 5B is a flowchart of a process for requesting a shared smart space of two users, according to one embodiment. In one embodiment, the personal smart space application 107 of the UE 101b performs the process 520 and is implemented in, for instance, a chip set including a processor and a memory as shown FIG. 16. In step 521, the personal smart space application 107 (e.g., running on the secretary's PC) generates a request specifying selective sharing of semantic information sets corresponding to a personal information space (e.g., the manager's business calendar). The personal smart space application 107 then initiates transmission of the request to a peer user equipment (e.g., the manager's personal device) for merging a projection of the semantic information sets into a shared information space (Step 523).

Figure 6:
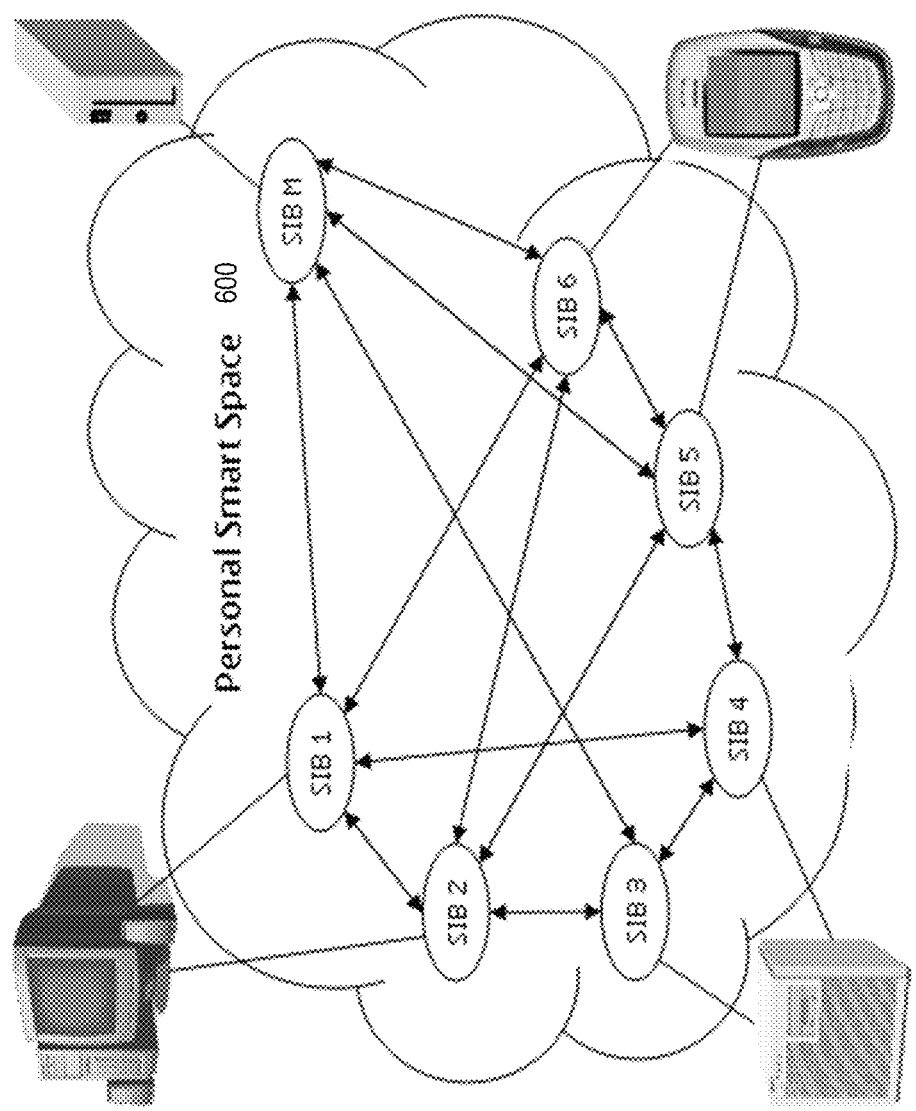
FIG. 6 is a diagram of a personal smart space, according to one embodiment.

FIG. 6 is a diagram of a personal smart space 600, according to one embodiment. A social networking space or a shared smart space within the personal smart space 600 is organized based on a peer-to-peer principle. It is noted that "peer-to-peer" refers to the general architectural principle, as oppose to client-server architecture. All personal data is stored in the personal smart space 600 under the control of the user. Every peer node 330 (FIG. 3) in the information world level 210 (FIG. 2) may obtain access to a personal space of the user that is physically distributed over a number of devices of different types, e.g. personal computers, mobile devices, public and personal data storages, routers, network servers, web service servers, social network servers, etc. in the device world level 230, and access to the services in the service world level 220, via the SIBs. As such, the user has the same access to all personal data from any device when entering to the personal smart space 600.

Figure 7:
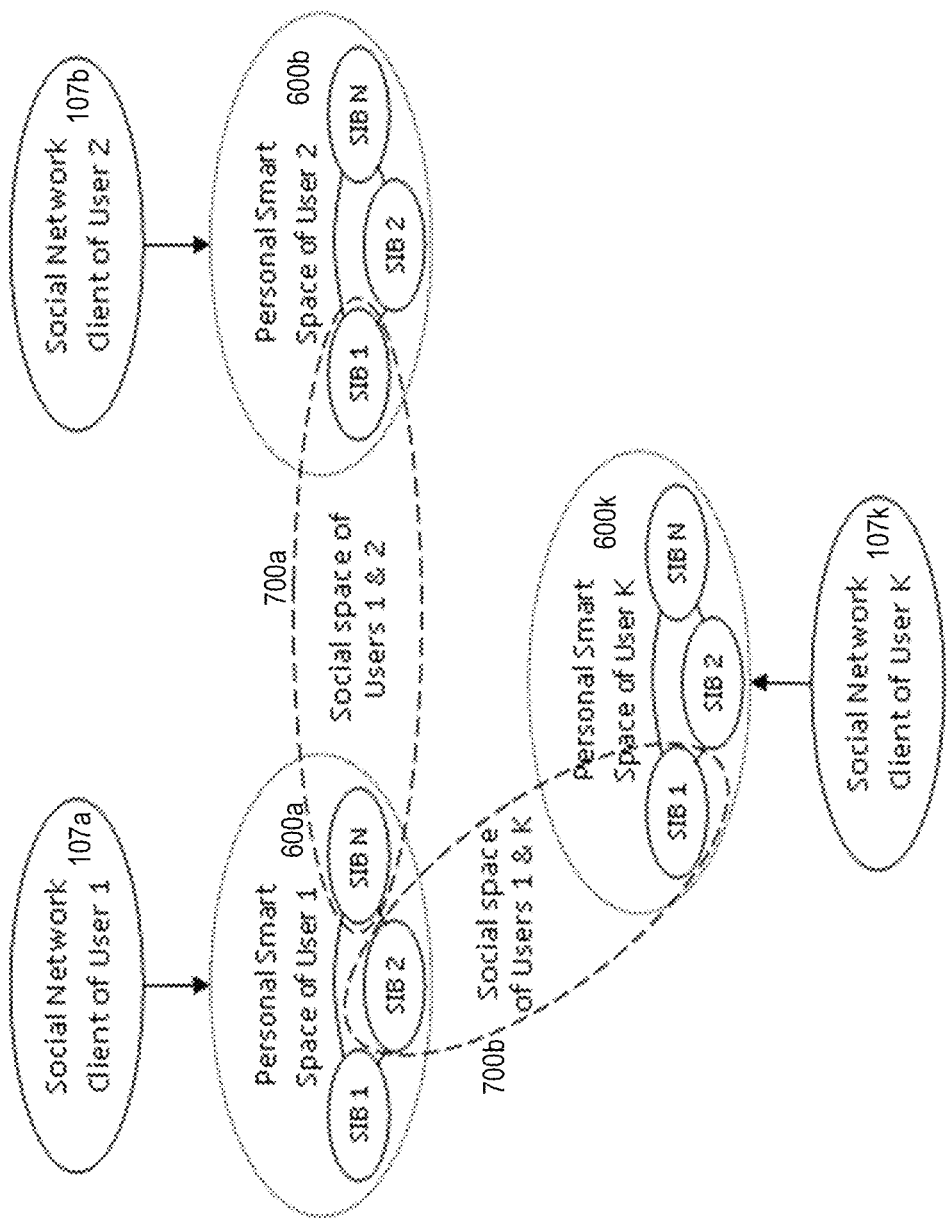
FIG. 7 is a diagram of shared smart spaces merged by parts of personal smart spaces, according to one embodiment.

FIG. 7 is a diagram of shared smart spaces 700 merged by parts of personal smart spaces 600, according to one embodiment. The proposed social networking solution is implemented via the Semantic Information Brokers (SIB) 320, which integrate themselves with other services in the service world level 220 and information in the information world level 210, and makes them available and equally efficient for use from personal computers and mobile devices. Each smart space entity can be considered as an information set aggregated from different sources. For example, the user's personal smart space contains information of the user's personal information, family information, work information, social network information, etc. which came from all sources such as the government, the user's doctors, employers, classmates, families and friends, business contacts, associations, etc. This multisourcing consideration is flexible since it accounts that the same piece of information can come from different sources. Every user has the user's space, called a personal smart space 600, as shown in FIG. 6. The smart spaces 600 themselves can interact through merging and projection thereby enabling larger smart spaces to be constructed either on a permanent or temporary basis. Moreover, a smart space may be a personal space, a share/social space of at least two users, a group space, a public space of a community, a county, a state, or a county, etc., and the like. The aggregation of all smart spaces 600 constitutes the world of information (including the semantic web) which is also referred to as a smart space.

When two users decide to become friends in a social network, they allow sharing of some part of their respective personal spaces 600a and 600b with the new peer. The shared/social smart space 700 of these two users is created by merging a part of their personal smart spaces 600a-600b, as shown in FIG. 7.

Merging is a process of (1) identifying information sets to be shared (e.g., the information set projected in SIB N of the personal smart space 600a of a user 1, and the information set projected in SIB 1 of the personal smart space 600b of a user 2); and (2) merging the SIB N and SIB 1 within the boundary of the shared smart space 700a (shown by dashed lined ovals). FIG. 7 also shows a shared space 700b made of the information set projected in SIB 2 of the personal smart space 600a of a user 1, and the information set projected in SIB 1 of the personal smart space 600k of a user K. Such boundaries are determined by the depth of the particular information set and rules applied during the transition period. When one user modifies a shared information item in the shared smart space 700, the user can inject the modified information item back into the shared smart space 700 and the relevant SIB tracks the history of modification. If later the users decide to discontinue the sharing, a process of splitting (i.e., a reverse process of merging) is executed to dissolve the shared smart space 700a. The splitting may consider the modification history of the shared smart space 700 to recover the information items prior to the merger of the personal smart spaces 600 to form the shared smart space 700. During any of the processes of either splitting or merging, the most important part is to identify and to guarantee sustained boundaries of the process.

Within the smart space, the shared smart space 700 is created as a merger of projections of the information sets that the users have decided to share with a given peer. The processes 500 and 520 enable the user to differentiate information sets shared with different friends as much as desired, without restrictions by the rules of the social networking platform 103b. The user is free to share personal data with personal friends, work related materials with colleagues, and the sets of shared information can be completely isolated from each other, or partially or fully overlap. Also the social/shared space 700 can be expanded to as many users as desired to create a group social/shared smart space. In addition, a peer-to-peer social/shared space of a sub-group within the group can enter into a group social/shared space by its entirety and preserve its autonomy and integrity.

Figure 8:
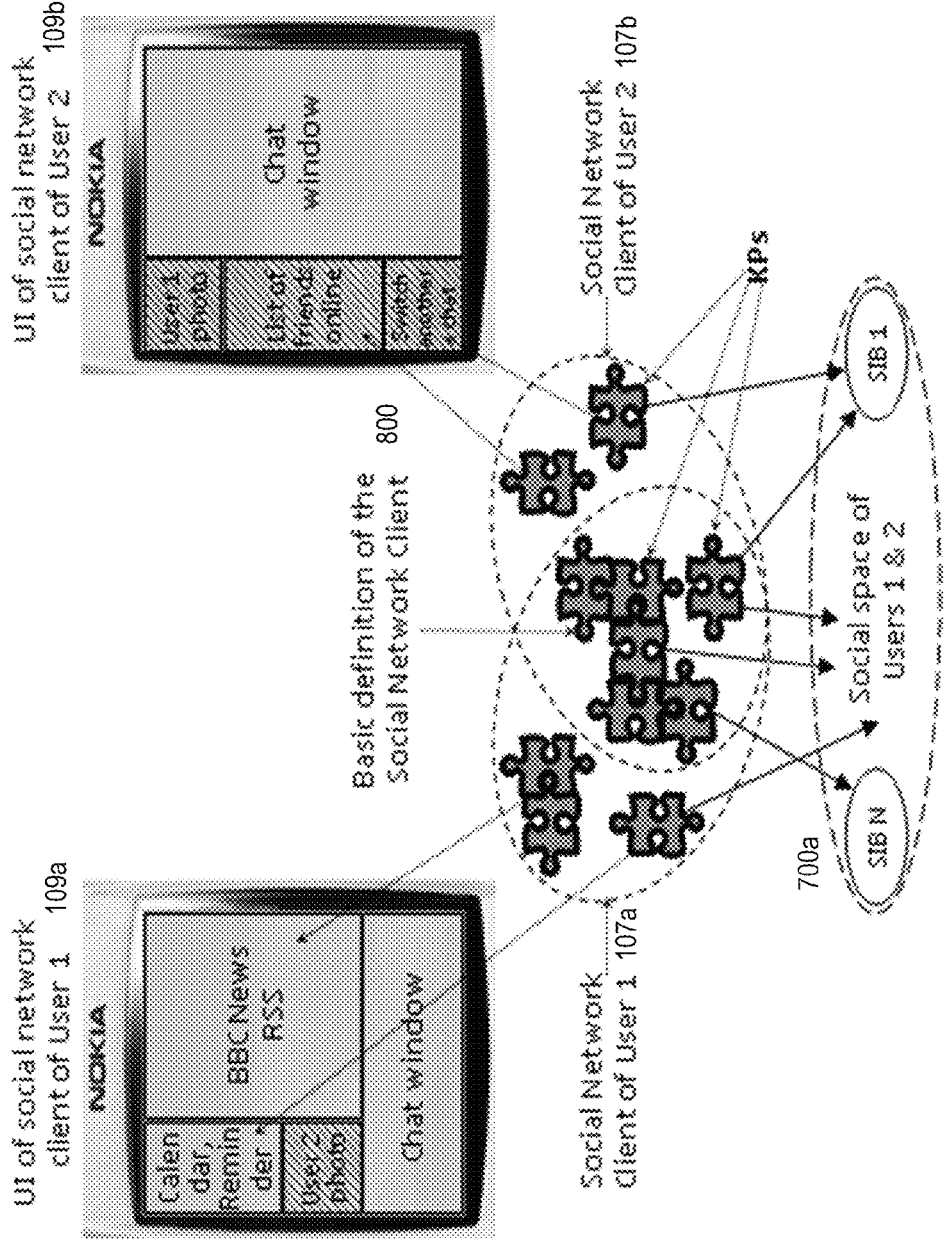
FIG. 8 is a diagram of an architecture of a social network client application, according to one embodiment.

FIG. 8 is a diagram of an architecture of a social/shared network client application 800, according to one embodiment, which provides great flexibility in defining the shared smart space 700. The client application 800 includes a group of knowledge processors (KPs), which are smart space applications and can be seen as blocks for providing users with exact functions as demanded. In one embodiment, a KP is also an entity contributing to insert/remove and/or query/subscribe content/information according to ontology relevant to its own defined functionality. A KP works with one or more partner KPs to share the content/information. The KPs are, for instance, physically located at any devices or equipment, and connected to the shared smart space 700a. Such an architecture allows a user to personalize, for example, functions and UI of the social network client 800. The architecture in FIG. 8 exposes a smart space as a service. The service is accessed by a KP acting as a client of the service. KPs running in different social network clients are able to access the shared/social smart space 700.

By way of example, the personal smart space application 107 defines a set of basic definitions of the social networking client application 800. Each of the personal smart space applications 107a, 107b further set KPs that customize functionality to be displayed on their respective UI 109. The visible KPs are illustrated in FIG. 8, e.g., KPs that implement a "Calendar/Reminder" function and a "BBC News RSS" function are displayed in a UI 109a (e.g., of the manager) and a "List of friends on line" function and a "switch to another active chat" function are displayed in a UI 109 b (e.g., of the secretary). Other KPs are invisible on the UIs 109 but still perform functions with the collected data. For example, the user can install a KP that performs reasoning over information extracted from a Short Message Service (SMS) and a chat engine of the social network, to determine/define what social events in the town might be of a mutual interest for the user and the peer. In another example, the user can install another KP that determines all user preferences (including the peer's preferences), especially those that have not been explicitly specified, but obtained from reasoning of the peer's behaviors using all devices and applications connected to the smart space), and then delivers a message including all or part of the user preferences to the peer.

In a sample use case, the personal smart space application 107 and the social network client application 800 are applied to establish a professional social network for supporting cooperation in joint projects. The existing solutions to facilitate joint work in multi-site project do not support interoperable social network sharing services across platforms, devices, and equipment. Existing solutions like Voice over Internet Protocol (VoIP) and shared data repositories, social networks like LinkedIn® and Facebook® do not create an interoperable framework for sharing information, and it takes significant work to for the users to bridge these solutions and some automated solutions to provide the same professional social network. The applications 107 and 800 make the shared information sets accessible from personal computers and mobile devices, and the activity status follows user's migration between the devices. In addition, additional services, such as short voice messages, shared touch-screen whiteboard for participants of teleconference and so on, are introduced via the appellations 107 and 800. By introducing additional KPs, the applications 107 and 800 link accounts and services from other social networks into the existing social network clients (similar to the example illustrated in FIG. 8 for BBC News RRS), so that the user can use one application and smoothly move the user's social life in Internet to the smart space.

Since the shared smart spaces are created as a merger of projections of the information sets in SIBs that the users have decided to share with the given peer, it is unnecessary to define separate data ontology for the social network, as every user stays within the scope of the personal smart space ontology definitions.

As mentioned, the social network client 800 is defined as a smart space application and includes a number of knowledge processors that perform operations over information in the shared smart space 700, and allows services via personal computers as well as from mobile devices. The personal smart space application 107 defines a basic set of KPs for the sharing service. The personal smart space application 1107 also enables personalization of the social network client 800 according to user preferences including the number and variety of the related KPs.

Examples of KPs available to the social network client are described below.

Figure 9:
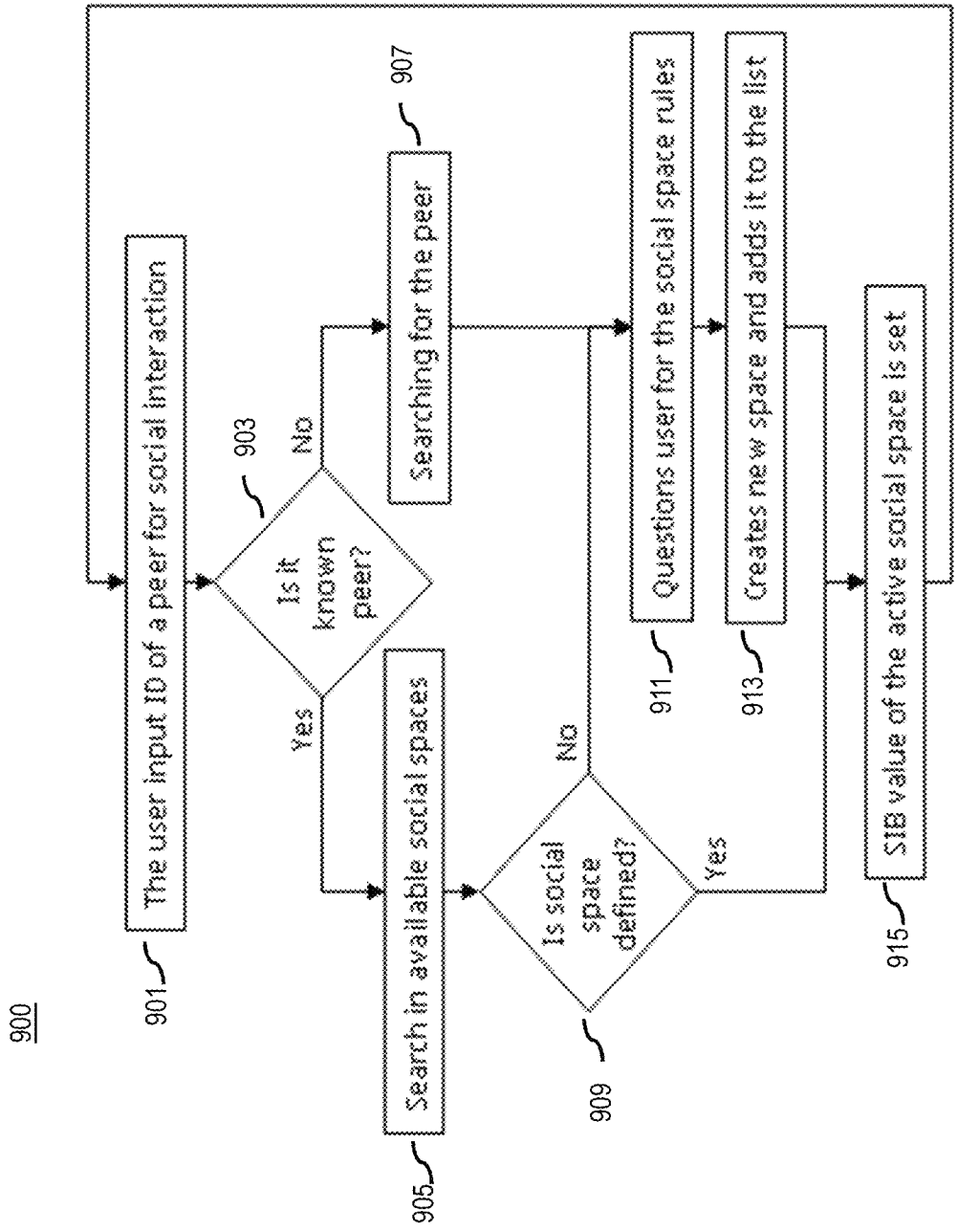
FIG. 9 is a flowchart of a process for merging personal smart spaces, according to one embodiment.

FIG. 9 is a flowchart of a process 900 for merging personal smart spaces executed by a KP named Manager of Shared/social Smart Spaces, according to one embodiment. This KP creates new share smart spaces, maintains the list of available shared/social smart spaces, and allows searching in the available spaces using a peer-to-peer principle and using registration servers (which contain user IDs and details of how to contact a user). In Step 901, the KP prompts the user to input an ID of a peer for social interaction. The KP then searches over the user's personal smart space 600 to see if the peer is known to the user (Step 303). If the peer is known to the user, the KP searches among existing shared/social smart spaces to see if there is an existing shared/social smart space for the user and the peer (Step 905). If such a shared/social smart space already defined (Step 909), the KP determines that a SIB value of the existing/active shared/social smart space 700 of the user and the peer is set (Step 915), and proceeds to the next peer. If such a shared/social smart space has not defined (Step 909), the KP asks questions to the user for a set of shared/social smart space rules to set a shared/social smart space (Step 911), creates a new shared/social smart space for the user and the peer, adds the new shared/social smart space to a shared/social smart space list of the user (Step 913), sets a SIB value for the new shared/social smart space 700 of the user and the peer (Step 915), and proceeds to the next peer.

If the peer is not known to the user, the KP searches over the smart space to find a personal smart space of the peer (Step 907) so as to create a new shared/social smart space for the user and the peer. After finding the peer's personal smart space, the KP asks questions to the user for generating a set of shared/social smart space rules to set a shared/social smart space (Step 911), creates a new shared/social smart space for the user and the peer, adds the new social sauce to a shared/social smart space list of the user (Step 913), sets a SIB value for the new shared/social smart space 700 of the user and the peer (Step 915), and proceeds to the next peer. For example, the information or questions to be answered for generating the set of shared/social smart space rules includes the peer's user ID, name, e-mail address, the scope/category/content of the share semantic information sets, etc.

Figure 10:
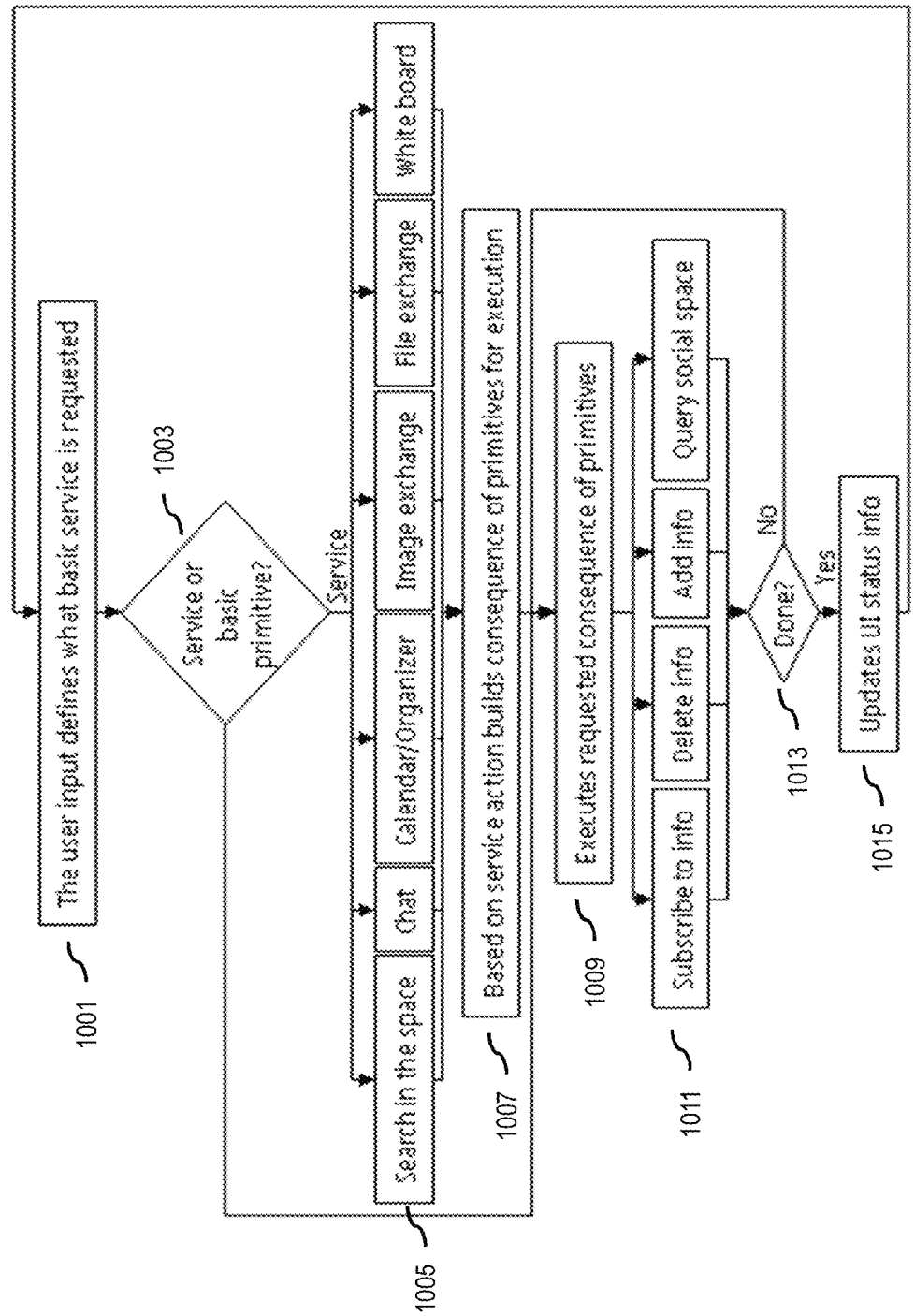
FIG. 10 is a flowchart of a process for managing personal smart space services, according to one embodiment.

FIG. 10 is a flowchart of a process 1000 for managing personal smart space services executed by a KP named Shared/social Smart Space Communicator, according to one embodiment. This KP defines all basic queries, subscriptions, handling of collisions and information access rights in the shared/social smart space 700, and provides the user with a set of basic services, i.e. chat, sharable calendar and organizer, file exchange, image sharing, white board which are already defined and available for the user to activate. In Step 1001, the KP prompts the user to input what basic service is requested. The KP determines whether the user requests a service or a basic primitive. A basic primitive can be a mechanism for random sampling the traffic, a mechanism for saving headers of dropped packets, a mechanism for tagging packets with the ingress interface, a mechanism to access to routing tables, a mechanism for rate-limiting an aggregate before the output queue, etc. If is the user requests a basic primitive (Step 1003), the KP executes it. If the user requests a service, such as "Search in the space", "Chat", "Calendar/Organizer", "Image exchange", "File exchange", or "White board" (Step 1005). The KP then builds a consequence of basic primitives for execution based upon the requested service (Step 1007), and executes the consequence of basic primitives (Step 1009), such as "Subscribe to info", "Delete info", "Add info", or "Query shared/social smart space" (Step 1011). After the consequence of basic primitives are done (Step 1013), the KP updates UI status information (Step 1015) and proceeds to next requested basic primitive or service.

Figure 11:
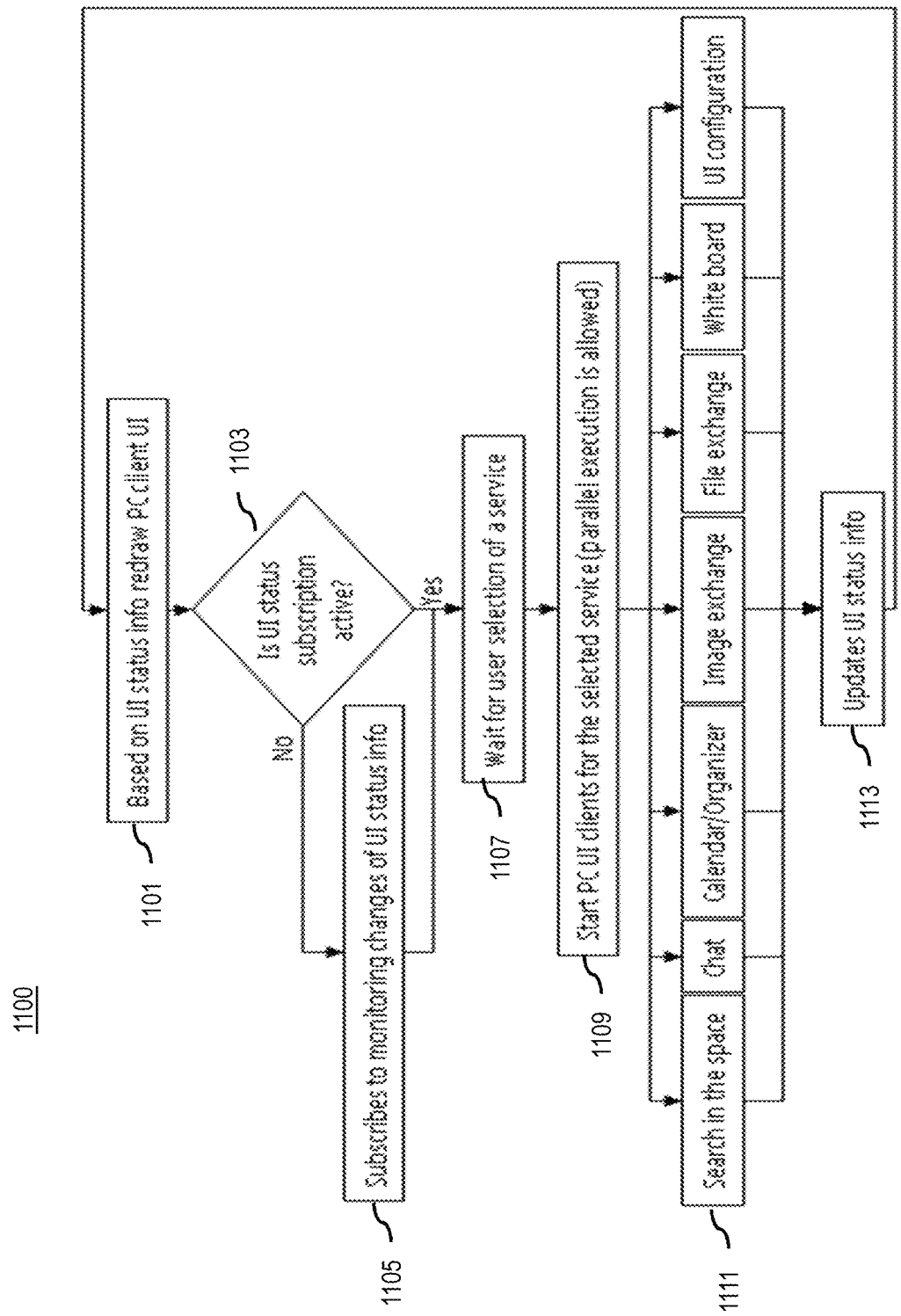
FIG. 11 is a flowchart of a process for setting a personal smart space user interface for a computer, according to one embodiment.

FIG. 11 is a flowchart of a process 1100 for setting a personal smart space user interface for a computer executed by a KP named Shared/social Smart Space Client UI for PC, according to one embodiment. This KP defines a default user interface of the developed social network client 800 for a personal computer. In Step 1101, the KP redraws the PC client UI based upon an UI status. Thereafter, the KP determines if a subscription to use the UI is active (Step 1103). When the UI subscription status is active, the KP waits for the use to select a (Step 1107), starts PC UI clients for the selected service while allowing parallel execution (Step 1109) of the services of "Search in the space", "Chat", "Calendar/Organizer", "Image exchange", "File exchange", "White board" and "UI configuration" (Step 1111), and then updates UI subscription status information (Step 1113) and proceeds to the next requested service. When the UI subscription status is not active (e.g., automatic expiration after non-use for over a month), the KP subscribes to monitoring changes of the UI subscription status information (Step 1105), and then proceed to Steps 1107-1113 accordingly.

Figure 12:
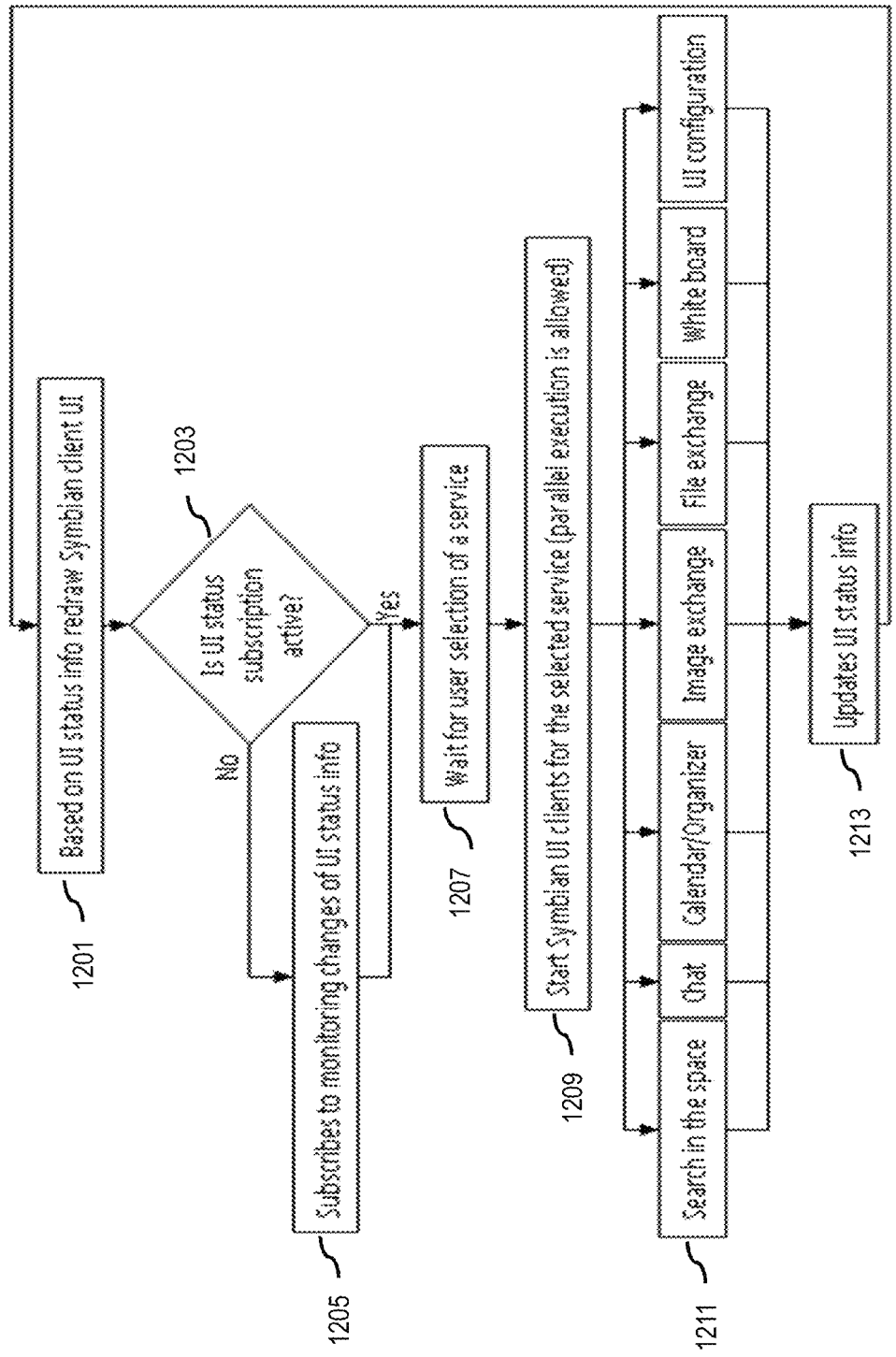
FIG. 12 is a flowchart of a process for setting a personal smart space user interface for a user equipment, according to one embodiment.

FIG. 12 is a flowchart of a process 1200 for setting a personal smart space user interface for a user equipment executed by a KP named Shared/social Smart Space Client UI for Mobile Device, according to one embodiment. This KP also supports any smart phone operating system (e.g., Symbian®), and defines a default user interface of the developed social network client for mobile devices. In Step 1101, the KP redraws the Symbian® client UI based upon the UI status. The steps 1203-1213 mirror the steps 1103-1113 of FIG. 11.

Figure 13:
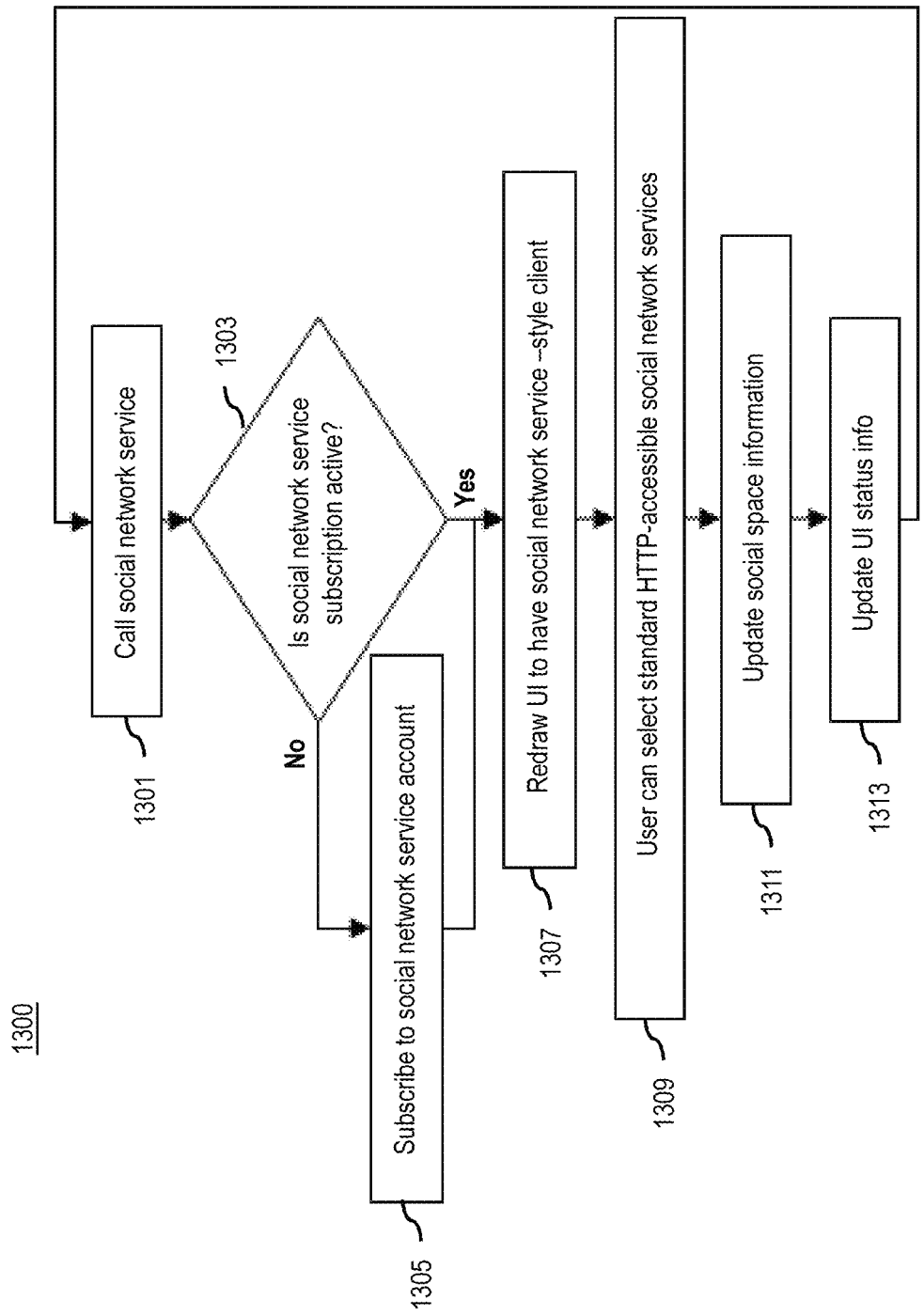
FIG. 13 is a flowchart of a process for setting a personal smart space user interface for a social network service platform, according to one embodiment.

FIG. 13 is a flowchart of a process 1300 for setting a personal smart space user interface for a social networking service platform executed by a KP named Social Network Gateway, according to one embodiment. This KP provides a basic interface to a user's account in a social network (e.g., Facebook®) and saves in the SIB structure all information flows coming through the Gateway and authorized by the user. In Step 1301, the KP calls the Facebook® service for the user. The KP then determines if the user's Facebook® subscription is active (Step 1303). When the subscription is active, the KP redraws the client UI to a Facebook® style (Step 1307), and prompts the user to select standard HTTP-accessible Facebook® services (Step 1309). Thereafter, the KP updates shared/social smart space information (Step 1311) and UI status information (Step 1313) and proceeds to next requested Facebook® service. When the subscription is not active, the KP prompts the user to subscribe to Facebook® (Step 1305), and then proceed to Steps 1307-1313 accordingly.

Figure 14:
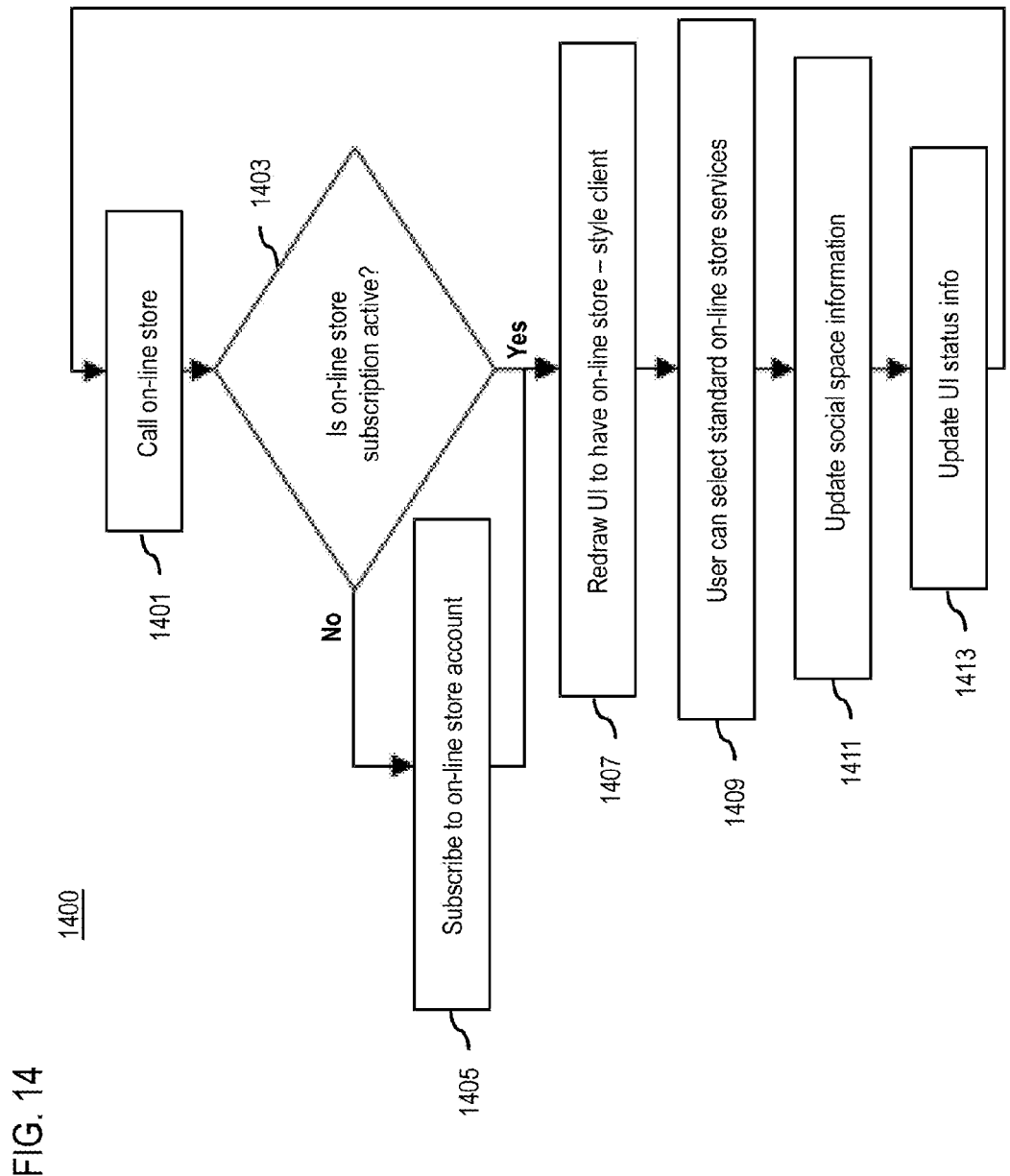
FIG. 14 is a flowchart of a process for setting a personal smart space user interface for a communications platform, according to one embodiment.

FIG. 14 is a flowchart of a process 1400 for setting a personal smart space user interface for a communications platform or an on-line store (e.g., OVI®) executed by a KP named Communications Network Gateway, according to one embodiment. This KP provides a basic interface to access a communications network repository which provides a basic set of pre-provided services in the smart space. In Step 1101, the KP calls the OVI® service for the user. The steps 1403-1413 mirror the steps 1303-1313 of FIG. 13.

The described social networking approach, in certain embodiments, is equally efficient for personal computers and all types of mobile devices, while guaranteeing access to the same pool of data and preserving successive user experience. In addition, the user has the flexibility to select services as desired for each client application and a toolkit for easy development of new personalized modules. The solution also maximizes UI efficiency and decreases use of all resources, including energy and network traffic since its application does not contain redundant modules. On top of the smart space, the social networking solution provides efficient reasoning over collected data and easy information exchange with other services available for the user at all user's devices. The solution further allows parallel/integrated use of the social network and existing social networks.

The processes described herein for selective sharing of semantic information sets in a smart space interoperable across platforms, devices, and equipment may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 15:
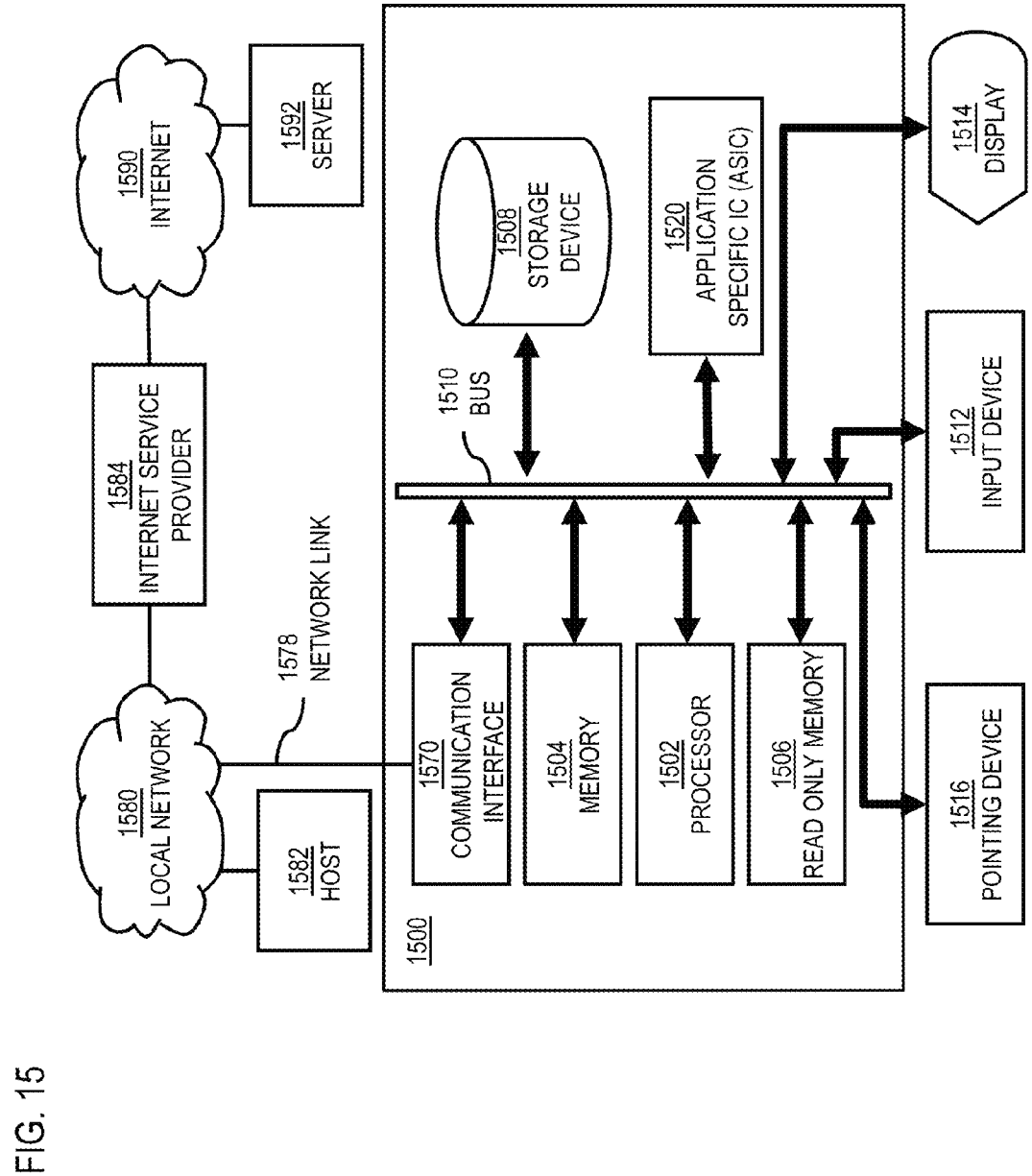
FIG. 15 is a diagram of hardware that can be used to implement an embodiment of the invention.

FIG. 15 illustrates a computer system 1500 upon which an embodiment of the invention may be implemented. Computer system 1500 is programmed (e.g., via computer program code or instructions) to selectively share semantic information sets in a smart space interoperable across platforms, devices, and equipment as described herein and includes a communication mechanism such as a bus 1510 for passing information between other internal and external components of the computer system 1500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1500, or a portion thereof, constitutes a means for performing one or more steps of selective sharing of semantic information sets in a smart space interoperable across platforms, devices, and equipment.

A bus 1510 includes one or more parallel conductors of information so that information is transferred quickly among devices coupled to the bus 1510. One or more processors 1502 for processing information are coupled with the bus 1510.

A processor 1502 performs a set of operations on information as specified by computer program code related to selectively share semantic information sets in a smart space interoperable across platforms, devices, and equipment. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1510 and placing information on the bus 1510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1500 also includes a memory 1504 coupled to bus 1510. The memory 1504, such as a random access memory (RAM) or other dynamic storage device, stores information including processor instructions for selective sharing of semantic information sets in a smart space interoperable across platforms, devices, and equipment. Dynamic memory allows information stored therein to be changed by the computer system 1500. RAM allows a unit of information stored at a location called a memory address to be stored and retrieved independently of information at neighboring addresses. The memory 1504 is also used by the processor 1502 to store temporary values during execution of processor instructions. The computer system 1500 also includes a read only memory (ROM) 1506 or other static storage device coupled to the bus 1510 for storing static information, including instructions, that is not changed by the computer system 1500. Some memory is composed of volatile storage that loses the information stored thereon when power is lost. Also coupled to bus 1510 is a non-volatile (persistent) storage device 1508, such as a magnetic disk, optical disk or flash card, for storing information, including instructions, that persists even when the computer system 1500 is turned off or otherwise loses power.

Information, including instructions for selective sharing of semantic information sets in a smart space interoperable across platforms, devices, and equipment, is provided to the bus 1510 for use by the processor from an external input device 1512, such as a keyboard containing alphanumeric keys operated by a human user, or a sensor. A sensor detects conditions in its vicinity and transforms those detections into physical expression compatible with the measurable phenomenon used to represent information in computer system 1500. Other external devices coupled to bus 1510, used primarily for interacting with humans, include a display device 1514, such as a cathode ray tube (CRT) or a liquid crystal display (LCD), or plasma screen or printer for presenting text or images, and a pointing device 1516, such as a mouse or a trackball or cursor direction keys, or motion sensor, for controlling a position of a small cursor image presented on the display 1514 and issuing commands associated with graphical elements presented on the display 1514. In some embodiments, for example, in embodiments in which the computer system 1500 performs all functions automatically without human input, one or more of external input device 1512, display device 1514 and pointing device 1516 is omitted.

In the illustrated embodiment, special purpose hardware, such as an application specific integrated circuit (ASIC) 1520, is coupled to bus 1510. The special purpose hardware is configured to perform operations not performed by processor 1502 quickly enough for special purposes. Examples of application specific ICs include graphics accelerator cards for generating images for display 1514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1500 also includes one or more instances of a communications interface 1570 coupled to bus 1510. Communication interface 1570 provides a one-way or two-way communication coupling to a variety of external devices that operate with their own processors, such as printers, scanners and external disks. In general the coupling is with a network link 1578 that is connected to a local network 1580 to which a variety of external devices with their own processors are connected. For example, communication interface 1570 may be a parallel port or a serial port or a universal serial bus (USB) port on a personal computer. In some embodiments, communications interface 1570 is an integrated services digital network (ISDN) card or a digital subscriber line (DSL) card or a telephone modem that provides an information communication connection to a corresponding type of telephone line. In some embodiments, a communication interface 1570 is a cable modem that converts signals on bus 1510 into signals for a communication connection over a coaxial cable or into optical signals for a communication connection over a fiber optic cable. As another example, communications interface 1570 may be a local area network (LAN) card to provide a data communication connection to a compatible LAN, such as Ethernet. Wireless links may also be implemented. For wireless links, the communications interface 1570 sends or receives or both sends and receives electrical, acoustic or electromagnetic signals, including infrared and optical signals, that carry information streams, such as digital data. For example, in wireless handheld devices, such as mobile telephones like cell phones, the communications interface 1570 includes a radio band electromagnetic transmitter and receiver called a radio transceiver. In certain embodiments, the communications interface 1570 enables connection from the UE 101 to the communication network 105 for selective sharing of semantic information sets in a smart space interoperable across platforms, devices, and equipment.

The term computer-readable medium is used herein to refer to any medium that participates in providing information to processor 1502, including instructions for execution. Such a medium may take many forms, including, but not limited to, non-volatile media, volatile media and transmission media. Non-volatile media include, for example, optical or magnetic disks, such as storage device 1508. Volatile media include, for example, dynamic memory 1504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1520.

Network link 1578 typically provides information communication using transmission media through one or more networks to other devices that use or process the information. For example, network link 1578 may provide a connection through local network 1580 to a host computer 1582 or to equipment 1584 operated by an Internet Service Provider (ISP). ISP equipment 1584 in turn provides data communication services through the public, world-wide packet-switching communication network of networks now commonly referred to as the Internet 1590. A computer called a server host 1592 connected to the Internet hosts a process that provides a service in response to information received over the Internet. For example, server host 1592 hosts a process that provides information representing video data for presentation at display 1514.

At least some embodiments of the invention are related to the use of computer system 1500 for implementing some or all of the techniques described herein. According to one embodiment of the invention, those techniques are performed by computer system 1500 in response to processor 1502 executing one or more sequences of one or more processor instructions contained in memory 1504. Such instructions, also called computer instructions, software and program code, may be read into memory 1504 from another computer-readable medium such as storage device 1508 or network link 1578. Execution of the sequences of instructions contained in memory 1504 causes processor 1502 to perform one or more of the method steps described herein. In alternative embodiments, hardware, such as ASIC 1520, may be used in place of or in combination with software to implement the invention. Thus, embodiments of the invention are not limited to any specific combination of hardware and software, unless otherwise explicitly stated herein.

The signals transmitted over network link 1578 and other networks through communications interface 1570, carry information to and from computer system 1500. Computer system 1500 can send and receive information, including program code, through the networks 1580, 1590 among others, through network link 1578 and communications interface 1570. In an example using the Internet 1590, a server host 1592 transmits program code for a particular application, requested by a message sent from computer 1500, through Internet 1590, ISP equipment 1584, local network 1580 and communications interface 1570. The received code may be executed by processor 1502 as it is received, or may be stored in memory 1504 or in storage device 1508 or other non-volatile storage for later execution, or both. In this manner, computer system 1500 may obtain application program code in the form of signals on a carrier wave.

Various forms of computer readable media may be involved in carrying one or more sequence of instructions or data or both to processor 1502 for execution. For example, instructions and data may initially be carried on a magnetic disk of a remote computer such as host 1582. The remote computer loads the instructions and data into its dynamic memory and sends the instructions and data over a telephone line using a modem. A modem local to the computer system 1500 receives the instructions and data on a telephone line and uses an infra-red transmitter to convert the instructions and data to a signal on an infra-red carrier wave serving as the network link 1578. An infrared detector serving as communications interface 1570 receives the instructions and data carried in the infrared signal and places information representing the instructions and data onto bus 1510. Bus 1510 carries the information to memory 1504 from which processor 1502 retrieves and executes the instructions using some of the data sent with the instructions. The instructions and data received in memory 1504 may optionally be stored on storage device 1508, either before or after execution by the processor 1502.

Figure 16:
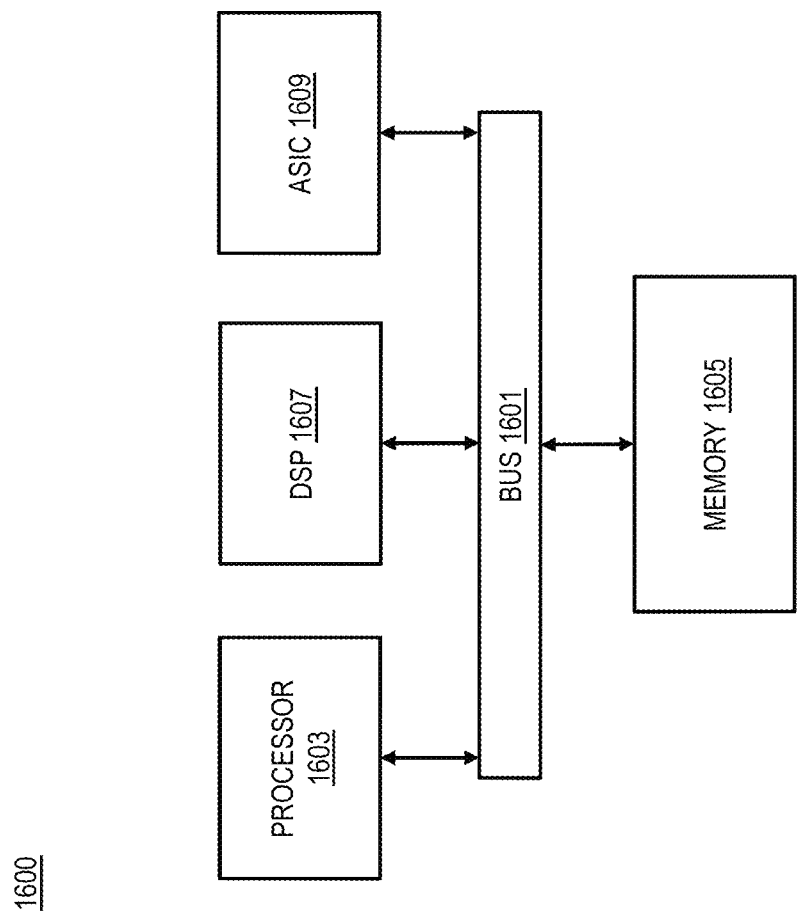
FIG. 16 is a diagram of a chip set that can be used to implement an embodiment of the invention.

FIG. 16 illustrates a chip set 1600 upon which an embodiment of the invention may be implemented. Chip set 1600 is programmed to selectively share semantic information sets in a smart space interoperable across platforms, devices, and equipment as described herein and includes, for instance, the processor and memory components described with respect to FIG. 15 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1600, or a portion thereof, constitutes a means for performing one or more steps of selective sharing of semantic information sets in a smart space interoperable across platforms, devices, and equipment.

In one embodiment, the chip set 1600 includes a communication mechanism such as a bus 1601 for passing information among the components of the chip set 1600. A processor 1603 has connectivity to the bus 1601 to execute instructions and process information stored in, for example, a memory 1605. The processor 1603 may include one or more processing cores with each core configured to perform independently. A multi-core processor enables multiprocessing within a single physical package. Examples of a multi-core processor include two, four, eight, or greater numbers of processing cores. Alternatively or in addition, the processor 1603 may include one or more microprocessors configured in tandem via the bus 1601 to enable independent execution of instructions, pipelining, and multithreading. The processor 1603 may also be accompanied with one or more specialized components to perform certain processing functions and tasks such as one or more digital signal processors (DSP) 1607, or one or more application-specific integrated circuits (ASIC) 1609. A DSP 1607 typically is configured to process real-world signals (e.g., sound) in real time independently of the processor 1603. Similarly, an ASIC 1609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1603 and accompanying components have connectivity to the memory 1605 via the bus 1601. The memory 1605 includes both dynamic memory (e.g., RAM, magnetic disk, writable optical disk, etc.) and static memory (e.g., ROM, CD-ROM, etc.) for storing executable instructions that when executed perform the inventive steps described herein to selectively share semantic information sets in a smart space interoperable across platforms, devices, and equipment. The memory 1605 also stores the data associated with or generated by the execution of the inventive steps.

Figure 17:
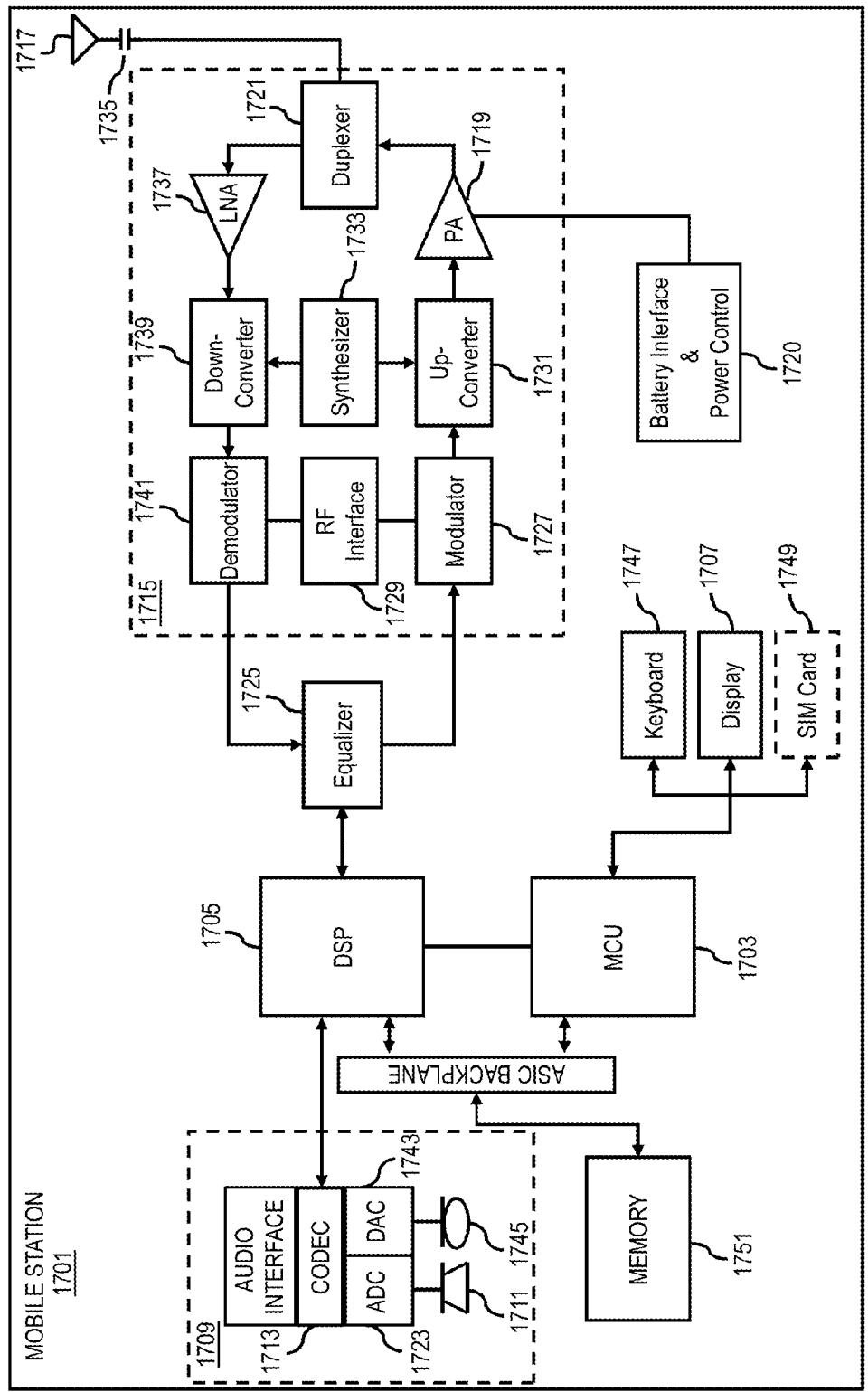
FIG. 17 is a diagram of a mobile station (e.g., handset) that can be used to implement an embodiment of the invention.

FIG. 17 is a diagram of exemplary components of a mobile terminal (e.g., handset) for communications, which is capable of operating in the system of FIG. 1, according to one embodiment. In some embodiments, mobile terminal 1700, or a portion thereof, constitutes a means for performing one or more steps of selective sharing of semantic information sets in a smart space interoperable across platforms, devices, and equipment. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application, the term "circuitry" would also cover an implementation of merely a processor (or multiple processors) and its (or their) accompanying software/or firmware. The term "circuitry" would also cover, for example, a baseband integrated circuit or applications processor integrated circuit in a mobile phone or a similar integrated circuit in a cellular network device or other network devices.

Pertinent internal components of the telephone include a Main Control Unit (MCU) 1703, a Digital Signal Processor (DSP) 1705, and a receiver/transmitter unit including a microphone gain control unit and a speaker gain control unit. A main display unit 1707 provides a display to the user in support of various applications and mobile terminal functions that perform or support the steps of selective sharing of semantic information sets in a smart space interoperable across platforms, devices, and equipment. The display unit 1707 includes display circuitry configured to display at least a portion of a user interface of the mobile terminal (e.g., mobile telephone). Additionally, the display unit 1707 and display circuitry are configured to facilitate user control of at least some functions of the mobile terminal. An audio function circuitry 1709 includes a microphone 1711 and microphone amplifier that amplifies the speech signal output from the microphone 1711. The amplified speech signal output from the microphone 1711 is fed to a coder/decoder (CODEC) 1713.

A radio section 1715 amplifies power and converts frequency in order to communicate with a base station, which is included in a mobile communication system, via antenna 1717. The power amplifier (PA) 1719 and the transmitter/modulation circuitry are operationally responsive to the MCU 1703, with an output from the PA 1719 coupled to the duplexer 1721 or circulator or antenna switch, as known in the art. The PA 1719 also couples to a battery interface and power control unit 1720.

In use, a user of mobile terminal 1701 speaks into the microphone 1711 and his or her voice along with any detected background noise is converted into an analog voltage. The analog voltage is then converted into a digital signal through the Analog to Digital Converter (ADC) 1723. The control unit 1703 routes the digital signal into the DSP 1705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1725 for compensation of any frequency-dependent impairments that occur during transmission though the air such as phase and amplitude distortion. After equalizing the bit stream, the modulator 1727 combines the signal with a RF signal generated in the RF interface 1729. The modulator 1727 generates a sine wave by way of frequency or phase modulation. In order to prepare the signal for transmission, an up-converter 1731 combines the sine wave output from the modulator 1727 with another sine wave generated by a synthesizer 1733 to achieve the desired frequency of transmission. The signal is then sent through a PA 1719 to increase the signal to an appropriate power level. In practical systems, the PA 1719 acts as a variable gain amplifier whose gain is controlled by the DSP 1705 from information received from a network base station. The signal is then filtered within the duplexer 1721 and optionally sent to an antenna coupler 1735 to match impedances to provide maximum power transfer. Finally, the signal is transmitted via antenna 1717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1701 are received via antenna 1717 and immediately amplified by a low noise amplifier (LNA) 1737. A down-converter 1739 lowers the carrier frequency while the demodulator 1741 strips away the RF leaving only a digital bit stream. The signal then goes through the equalizer 1725 and is processed by the DSP 1705. A Digital to Analog Converter (DAC) 1743 converts the signal and the resulting output is transmitted to the user through the speaker 1745, all under control of a Main Control Unit (MCU) 1703—which can be implemented as a Central Processing Unit (CPU) (not shown).

The MCU 1703 receives various signals including input signals from the keyboard 1747. The keyboard 1747 and/or the MCU 1703 in combination with other user input components (e.g., the microphone 1711) comprise a user interface circuitry for managing user input. The MCU 1703 runs a user interface software to facilitate user control of at least some functions of the mobile terminal 1701 to selectively share semantic information sets in a smart space interoperable across platforms, devices, and equipment. The MCU 1703 also delivers a display command and a switch command to the display 1707 and to the speech output switching controller, respectively. Further, the MCU 1703 exchanges information with the DSP 1705 and can access an optionally incorporated SIM card 1749 and a memory 1751. In addition, the MCU 1703 executes various control functions required of the terminal. The DSP 1705 may, depending upon the implementation, perform any of a variety of conventional digital processing functions on the voice signals. Additionally, DSP 1705 determines the background noise level of the local environment from the signals detected by microphone 1711 and sets the gain of microphone 1711 to a level selected to compensate for the natural tendency of the user of the mobile terminal 1701.

The CODEC 1713 includes the ADC 1723 and DAC 1743. The memory 1751 stores various data including call incoming tone data and is capable of storing other data including music data received via, e.g., the global Internet. The software module could reside in RAM memory, flash memory, registers, or any other form of writable storage medium known in the art. The memory device 1751 may be, but not limited to, a single memory, CD, DVD, ROM, RAM, EEPROM, optical storage, or any other non-volatile storage medium capable of storing digital data.

An optionally incorporated SIM card 1749 carries, for instance, important information, such as the cellular phone number, the carrier supplying service, subscription details, and security information. The SIM card 1749 serves primarily to identify the mobile terminal 1701 on a radio network. The card 1749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    creating, by a processor, a personal information space for a user, wherein the personal information space includes a plurality of semantic information sets, each semantic information set respectively denoting information about a subject, an object, and a relationship between the subject and the object, wherein the personal information space is created in a user equipment of the user;
    receiving a request for selective sharing of the plurality of semantic information sets;
    merging, in response to the request, a projection of the selected semantic information sets into a shared information space; and
    synchronizing the plurality of semantic information sets stored in the personal information space and the shared information space with a plurality of other semantic information sets stored in a social networking platform or a communication platform,
    wherein the personal information space and the shared information space are created in a smart space, the smart space having a logical architecture that specifies interoperability across a plurality of platforms composed by different devices and equipment, and the devices and equipment including the user equipment, the social networking platform, and the communication platform.

2. The method of claim 1, further comprising:
    creating a group shared information space shared by a group of users; and
    initiating entry of a subgroup shared information space of a subgroup of the users into the group shared information space while preserving autonomy and integrity of the subgroup information space.

3. The method of claim 1, further comprising:
    providing a knowledge processor application running on one or more devices, one or more equipment, or a combination thereof connected to the shared information space; and
    customizing and executing at least one function and a user interface of a user equipment via the knowledge processor application.

4. The method of claim 3, wherein the knowledge processor application is configured to, at least in part, cause a linking of one or more accounts, services, or a combination thereof from at least one other social networking platform or communication platform with the one or more accounts, services, or a combination thereof of the social networking platform or the communication platform.

5. The method of claim 3, wherein the knowledge processor application performs reasoning over information extracted from a Short Message Service (SMS) and a chat engine of the social network platform, and defines social events of a mutual interest for the user and a peer based on the reasoning.

6. The method of claim 5, wherein the knowledge processor application determines user preferences obtained from reasoning of behaviors of a peer user using the devices and equipment connected to the smart space, and sends a message including the user preferences to a user equipment of the peer user.

7. The method of claim 1, wherein the smart space comprises a plurality of semantic information brokers that reside on the different devices and equipment and process queries, subscriptions, handling of collisions, and information access rights.

8. The method of claim 7, wherein the semantic information sets are stored on the different devices and equipment and projected into the semantic information brokers.

9. An apparatus comprising:
    at least one processor; and
    at least one memory including computer program code,
    the at least one memory and the computer program code configured to, with the at least one processor, cause the apparatus to perform at least the following, create a personal information space for a user, wherein the personal information space includes a plurality of semantic information sets, each semantic information set respectively denoting information about a subject, an object, and a relationship between the subject and the object, wherein the personal information space is created in a user equipment of the user, receive a request for selective sharing of the plurality of semantic information sets, merge, in response to the request, a projection of the selected semantic information sets into a shared information space, and synchronize the plurality of semantic information sets stored in the personal information space and the shared information space with a plurality of other semantic information sets stored in a social networking platform or a communication platform, wherein the personal information space and the shared information space are created in a smart space, the smart space having a logical architecture that specifies interoperability across a plurality of platforms composed by different devices and equipment, and the devices and equipment including the user equipment, the social networking platform, and the communication platform.

10. The apparatus of claim 9, wherein the apparatus is further caused to:

create a group shared information space shared by a group of users; and initiate entry of a subgroup shared information space of a subgroup of the users into the group shared information space while preserving autonomy and integrity of the subgroup information space.

11. The apparatus of claim 9, wherein the apparatus is further caused to:

provide a knowledge processor application running on one or more devices, one or more equipment, or a combination thereof connected to the shared information space; and customize and executing at least one function and a user interface of a user equipment via the knowledge processor application.

12. The apparatus of claim 11, wherein the knowledge processor application is configured to, at least in part, cause a linking of one or more accounts, services, or a combination thereof from at least one other social networking platform or communication platform with the one or more accounts, services, or a combination thereof of the social networking platform or a communication platform.

13. The apparatus of claim 11, wherein the knowledge processor application performs reasoning over information extracted from a Short Message Service (SMS) and a chat engine of the social network platform, and defines social events of a mutual interest for the user and a peer based on the reasoning.

14. The apparatus of claim 13, wherein the knowledge processor application determines user preferences obtained from reasoning of behaviors of a peer user using the devices and equipment connected to the smart space, and sends a message including the user preferences to a user equipment of the peer user.

15. The apparatus of claim 9, wherein the smart space comprises a plurality of semantic information brokers that reside on the different devices and equipment and process queries, subscriptions, handling of collisions, and information access rights.

16. A non-transitory computer-readable storage medium carrying one or more sequences of one or more instructions which, when executed by one or more processors, cause an apparatus to perform at least the following:

create a personal information space for a user, wherein the personal information space includes a plurality of semantic information sets, each semantic information set respectively denoting information about a subject, an object, and a relationship between the subject and the object, wherein the personal information space is created in a user equipment of the user, receive a request for selective sharing of the plurality of semantic information sets, merge, in response to the request, a projection of the selected semantic information sets into a shared information space, and synchronize the plurality of semantic information sets stored in the personal information space and the shared information space with a plurality of other semantic information sets stored in a social networking platform or a communication platform, wherein the personal information space and the shared information space are created in a smart space, the smart space having a logical architecture that specifies interoperability across a plurality of platforms composed by different devices and equipment, and the devices and equipment including the user equipment, the social networking platform, and the communication platform.

17. The non-transitory computer-readable storage medium of claim 16, wherein the apparatus is caused to further perform:

create a group shared information space shared by a group of users; and initiate entry of a subgroup shared information space of a subgroup of the users into the group shared information space while preserving autonomy and integrity of the subgroup information space.

18. The non-transitory computer-readable storage medium of claim 16, wherein the apparatus is caused to further perform:

provide a knowledge processor application running on one or more devices and/or one or more equipment connected to the shared information space; and customize and executing at least one function and a user interface of a user equipment via the knowledge processor application.

* * * * *